(12) United States Patent
Wu et al.

(10) Patent No.: US 11,336,641 B2
(45) Date of Patent: May 17, 2022

(54) SECURITY ENHANCED TECHNIQUE OF AUTHENTICATION PROTOCOL BASED ON TRUSTED EXECUTION ENVIRONMENT

(71) Applicant: Huawei Technologies Co., Ltd., Shenzhen (CN)

(72) Inventors: Teng Wu, Waterloo (CA); Yin Tan, Waterloo (CA); Stephen Sui Luen Li, Menlo Park, CA (US); Wei Xiong, Beijing (CN); Zhongyuan Zheng, Beijing (CN); Tao Hu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 16/830,857

(22) Filed: Mar. 26, 2020

(65) Prior Publication Data
US 2020/0280559 A1 Sep. 3, 2020

Related U.S. Application Data

(63) Continuation of application No. PCT/CN2017/103676, filed on Sep. 27, 2017.

(51) Int. Cl.
*H04L 29/06* (2006.01)
*H04L 9/00* (2022.01)
*H04L 9/08* (2006.01)
*H04L 9/32* (2006.01)

(52) U.S. Cl.
CPC .......... *H04L 63/0853* (2013.01); *H04L 9/006* (2013.01); *H04L 9/0869* (2013.01); *H04L 9/0877* (2013.01); *H04L 9/3247* (2013.01); *H04L 63/083* (2013.01); *H04L 63/0815* (2013.01); *H04L 63/0823* (2013.01)

(58) Field of Classification Search
CPC ... H04L 63/0853; H04L 9/006; H04L 9/0869; H04L 9/0877; H04L 9/3247; H04L 63/0815; H04L 63/0823; H04L 63/083
USPC ........................................................ 713/168
See application file for complete search history.

(56) References Cited

U.S. PATENT DOCUMENTS

| | | | | |
|---|---|---|---|---|
| 8,614,976 B1 * | 12/2013 | Everson | ................ | H04W 60/00 370/328 |
| 9,264,234 B2 * | 2/2016 | Farrugia | ................ | H04L 9/3247 |
| 9,490,984 B2 * | 11/2016 | Leicher | ................ | H04L 63/062 |
| 2003/0037241 A1 * | 2/2003 | Campagna | ............ | H04L 9/0863 713/170 |

(Continued)

FOREIGN PATENT DOCUMENTS

| CN | 102217280 A | 10/2011 |
|---|---|---|
| CN | 104506534 A | 4/2015 |

(Continued)

*Primary Examiner* — Sanchit K Sarker
(74) *Attorney, Agent, or Firm* — Slater Matsil, LLP

(57) ABSTRACT

The present disclosure is drawn to systems and methods for implementing authentication protocols based on trusted execution environments. Each of a principal device, an identity provider server and a service provider server are associated with a respective trusted execution environment. Authentication protocols are provided for registering the principal device to the identity provider server; authenticating the principal device to the identity provider server; and authenticating the principal device to a service provider server.

8 Claims, 28 Drawing Sheets

(56) References Cited

U.S. PATENT DOCUMENTS

| | | | | |
|---|---|---|---|---|
| 2006/0248333 | A1* | 11/2006 | Sandhu | H04L 9/0825 |
| | | | | 713/155 |
| 2011/0078439 | A1* | 3/2011 | Mao | H04W 12/06 |
| | | | | 713/156 |
| 2012/0072714 | A1* | 3/2012 | Grandcolas | H04L 9/3226 |
| | | | | 713/155 |
| 2016/0381522 | A1* | 12/2016 | Xia | H04M 9/02 |
| | | | | 370/312 |
| 2017/0024565 | A1* | 1/2017 | Dalcher | G06F 21/554 |
| 2018/0276664 | A1* | 9/2018 | Peng | G06Q 20/206 |

FOREIGN PATENT DOCUMENTS

| | | |
|---|---|---|
| CN | 104580250 A | 4/2015 |
| CN | 105656890 A | 6/2016 |
| CN | 107196901 A | 9/2017 |
| WO | 2007068716 A1 | 6/2007 |
| WO | 2017111383 A1 | 6/2017 |

\* cited by examiner

SECURITY ENHANCED TECHNIQUE OF AUTHENTICATION PROTOCOL BASED ON TRUSTED EXECUTION ENVIRONMENT

CROSS-REFERENCE TO RELATED APPLICATIONS

This application is a continuation of PCT Application Serial No. PCT/CN2017/103676, filed on Sep. 27, 2017 and entitled "Authentication Protocol Based on Trusted Execution Environment," the content of which is incorporated by reference in its entirety.

TECHNICAL FIELD

The present disclosure is generally drawn to authentication protocols, and more specifically to authentication based on trusted execution environments.

BACKGROUND

Authentication protocols are computer-based communications designed to allow for transfer of authentication data between two or more entities in a secure manner. Authentication protocols allow for a client device to be authenticated by a server and for the server to be authenticated to the client device. For example, a password-based authentication protocol allows a client device to send a password or other authentication string (e.g., a password hash) to a server. The server then verifies the received password against one stored in the server's database. If the received password matches the one in the database, the server then authenticates the client device. Password-based authentication protocols are examples of basic authentication protocols and are vulnerable to various threats.

Single-sign-on (SSO) is a technology that allows a user to login once and use difference services. For example, a user logs in with a single account identifier and password to gain access to various services without using different usernames or passwords for each service. Current SSO implementations rely on an access token which is stored in a cookie in cipher-text. An attacker may be able to access the cipher-text and use the cipher-text to login as the user without decrypting the cipher-text.

Therefore, there is a need for secure authentication protocols.

SUMMARY

The present disclosure is drawn to systems and methods for implementing authentication protocols based on trusted execution environments. Each of a principal device, an identity provider server and a server provider server are associated with a respective trusted execution environment. Authentication protocols are provided for a registration protocol between the principal device and the identity provider server; an authentication protocol between the principal device and the identity provider server; and an authentication protocol between the principal device and the service provider server.

In accordance with a broad aspect, there is provided a method for registering a principal device to an identity provider server. The method comprises transmitting, to the identity provider server, a registration request comprising a user identifier associated with a user of the principal device to the identity provider server; receiving, from the identity provider server, a signature for authenticating the identity provider server to the principal device from the identity provider server; authenticating the identity provider server using the signature; obtaining, from a trusted execution environment associated with the principal device, an authenticated encryption message based on the signature and a principal device key associated with the principal device from a trusted execution environment associated with the principal device; and transmitting, to the identity provider server, the authenticated encryption message for registration of the principal device to the identity provider server.

In at least some embodiments, obtaining the authenticated encryption message comprises generating, by the trusted execution environment associated with the principal device, at least one symmetric key derived from at least one random number obtained from the signature; and generating, by the trusted execution environment associated with the principal device, the authenticated encryption message using the at least one symmetric key.

In at least some embodiments, generating the at least one symmetric key comprises deriving a first symmetric key and a second symmetric key from a first random number and a user password, and wherein generating the authenticated encryption message comprises deriving a cipher text using the first symmetric key and deriving a message authentication code using the second symmetric key.

In at least some embodiments, the cipher text is derived from a second random number, the principal device key, a device identifier associated with the principal device and a secondary identifier associated with the user of the principal device.

In at least some embodiments, the message authentication code is derived from the second random number, the principal device key, the device identifier and the secondary identifier.

In at least some embodiments, a secondary device comprises the trusted execution environment, and the secondary device is communicatively coupled to the principal device.

In accordance with another broad aspect, there is provided a principal device comprising a processing unit and a memory having stored thereon program instructions. The program instructions are executable by the processing unit for performing the method of registering the principal device to an identity provider server as described above, in accordance with any of the described embodiments.

In accordance with another broad aspect, there is provided a method for authenticating a principal device to a server. The method comprises transmitting an authentication request comprising a user identifier associated with a user of the principal device to the server; receiving a signature for authenticating the server to the principal device from the server; authenticating the server using the signature; obtaining, from a trusted execution environment associated with the principal device, a first authenticated encryption message based on the signature and a principal device key associated with the principal device from a trusted execution environment associated with the principal device; and transmitting the first authenticated encryption message for authenticating the principal device to the server.

In at least some embodiments, the method further comprises receiving, from the server, a second authenticated encryption message generated using a service provider key; decrypting, by the trusted execution environment associated with the principal device, the second authenticated encryption message based on the signature and the principal device key to obtain the service provider key; and verifying, by the trusted execution environment associated with the principal device, the service provider key to confirm authentication of the principal device to the server.

In at least some embodiments, obtaining the first authenticated encryption message comprises: generating, by the trusted execution environment associated with the principal device, at least one symmetric key derived from at least one random number obtained from the signature, a user password and the principal device key; and generating, by the trusted execution environment associated with the principal device, the first authenticated encryption message using the at least one symmetric key.

In at least some embodiments, generating the at least one symmetric key comprises deriving a first symmetric key and a second symmetric key from a first random number, the user password, the principal device key and a secondary identifier associated with the user of the principal device, and wherein generating the first authenticated encryption message comprises deriving a first cipher text using the first symmetric key and deriving a first message authentication code using the second symmetric key.

In at least some embodiments, the first cipher text is derived from a second random number and the first message authentication code is derived from the second random number.

In at least some embodiments, decrypting the second authenticated encryption message comprises decrypting the second authenticated encryption message using at least one symmetric key derived from at least one random number obtained from the signature, a user password and the principal device key to obtain the service provider key and an encrypted ticket generated by encrypting the service provider key.

In at least some embodiments, the second authenticated encryption message comprises a second cipher text and a second message authentication code, and the second cipher text is derived from the service provider key.

In at least some embodiments, decrypting the second authenticated encryption message comprises: decrypting the second cipher text using a first symmetric key derived from a first random number, the user password, the principal device key and a secondary identifier associated with the user of the principal device to obtain the service provider key and the encrypted ticket; and decrypting the second message authentication code using a second symmetric key derived from the first random number, the user password, the principal device key and the secondary identifier.

In at least some embodiments, verifying the second authenticated encryption message comprises verifying the second cipher text using the second message authentication code.

In at least some embodiments, the authentication request comprises an encrypted ticket generated by encrypting a service provider key.

In at least some embodiments, obtaining the first authenticated encryption message comprises: generating, by the trusted execution environment associated with the principal device, at least one symmetric key derived from at least one random number obtained from the signature and a service provider key; and generating, by the trusted execution environment associated with the principal device, the authenticated encryption message using the at least one symmetric key.

In at least some embodiments, generating the at least one symmetric key comprises deriving a first symmetric key and a second symmetric key from a first random number and the service provider key, and wherein generating the first authenticated encryption message comprises deriving a cipher text using the first symmetric key and deriving a message authentication code using the second symmetric key.

In at least some embodiments, the cipher text is derived from a second random number and the message authentication code is derived from the second random number.

In at least some embodiments, a secondary device comprises the trusted execution environment, and the secondary device is communicatively coupled to the principal device.

In accordance with another broad aspect, there is provided a principal device comprising a processing unit and a memory having stored thereon program instructions. The program instructions are executable by the processing unit for performing the method of authenticating the principal device to a server as described above, in accordance with any of the described embodiments.

In accordance with another broad aspect, there is provided a method for registering a principal device by an identity provider server. The method comprises receiving, from the principal device, a registration request comprising a user identifier associated with a user of the principal device; obtaining, from a trusted execution environment of the identity provider server, a signature for authenticating the identity provider server to the principal device; transmitting, to the principal device, the signature; receiving, from the principal device, an authenticated encryption message generated based on the signature; decrypting, by the trusted execution environment of the identity provider server, the authenticated encryption message using at least one symmetric key to obtain a principal device key associated with the principal device; and registering the principal device using the principal device key.

In at least some embodiments, obtaining the signature comprises generating, by the trusted execution environment of the identity provider server, the signature using at least one random number.

In at least some embodiments, the method further comprises generating, by the trusted execution environment of the identity provider server, the at least one symmetric key from at least one random number and a user password.

In at least some embodiments, generating the at least one symmetric key comprises deriving a first symmetric key and a second symmetric key from a first random number and the user password.

In at least some embodiments, the authenticated encryption message comprises a cipher text and a message authentication code, and the cipher text is derived from a second random number, the principal device key, a device identifier associated with the principal device and a secondary identifier associated with the user of the principal device.

In at least some embodiments, decrypting the authenticated encryption message comprises decrypting the cipher text using the first symmetric key to obtain the second random number, the principal device key, the device identifier and the secondary identifier and decrypting the message authentication code using the second symmetric key.

In accordance with another broad aspect, there is provided an identity provider server comprising a processing unit and a memory having stored thereon program instructions. The program instructions are executable by the processing unit for performing the method of registering a principal device to the identity provider server as described above, in accordance with any of the described embodiments.

In accordance with another broad aspect, there is provided a method for authenticating a principal device by an identity provider server, the principal device having previously been registered by the identity provider server during which a principal device key associated with principal device was provided to the identity provider server. The method comprises receiving, from the principal device, an authentication request comprising a user identifier associated with a user of the principal device; obtaining, from a trusted execution environment of the identity provider server, a signature for authenticating the identity provider server to the principal device; transmitting, to the principal device, the signature; receiving, from the principal device, a first authenticated encryption message based on the signature and the principal device key; decrypting, by the trusted execution environment of the identity provider server, the first authenticated encryption message using at least one symmetric key to authenticate the principal device by the identity provider server; obtaining, from the trusted execution environment of the identity provider server, a second authenticated encryption message generated using a service provider key for use in authenticating to a service provider server; and transmitting, to the principal device, the second authenticated encryption to confirm authentication of the principal device by the identity provider server.

In at least some embodiments, obtaining the signature comprises generating, by the trusted execution environment associated with the principal device, the signature using at least one random number.

In at least some embodiments, the method further comprises generating, by the trusted execution environment of the identity provider server, the at least one symmetric key derived from at least one random number, a user password and the principal device key.

In at least some embodiments, generating the at least one symmetric key comprises deriving a first symmetric key and a second symmetric key from a first random number, the user password, the principal device key and a secondary identifier associated with the user of the principal device.

In at least some embodiments, the first authenticated encryption message comprises a first cipher text and a first message authentication code, and the first cipher text is derived from a second random number.

In at least some embodiments, decrypting the first authenticated encryption message using at least one symmetric key to authenticate the principal device to the identity provider server comprises decrypting the first cipher text using the first symmetric key to obtain the second random number, and decrypting the first message authentication code using the second symmetric.

In at least some embodiments, obtaining the second authenticated encryption message comprises generating, by the trusted execution environment of the identity provider server, the second authenticated encryption message using the at least one symmetric key, wherein the second authenticated encryption message is generated using the service provider key and an encrypted ticket generated by encrypting the service provider key.

In at least some embodiments, the second authenticated encryption message comprises a second cipher text encrypted using a first symmetric key derived from a first random number, the user password, the principal device key and a secondary identifier associated with the user of the principal device, and a second message authentication code encrypted using a second symmetric key derived from the first random number, the user password, the principal device key and the secondary identifier; and the second cipher text is derived from the service provider key and the encrypted ticket.

In accordance with another broad aspect, there is provided an identity provider server comprising a processing unit and a memory having stored thereon program instructions. The program instructions are executable by the processing unit for performing the method of authenticating a principal device to the identity provider server as described above, in accordance with any of the described embodiments.

In accordance with another broad aspect, there is provided a method for authenticating a principal device by a service provider server, the principal device having previously been authenticated by an identity provider server during which a service provider key was provided to the principal device. The method comprises receiving, from the principal device, an authentication request comprising a user identifier associated with a user of the principal device and the service provider key; obtaining, from a trusted execution environment of the service provider server, a signature for authenticating the service provider server to the principal device; transmitting, to the principal device, the signature; receiving, from the principal device, an authenticated encryption message based on the signature and the service provider key; and decrypting, by the trusted execution environment of the identity provider server, the authenticated encryption message to obtain the contents of the authenticated encryption message; verifying, by the trusted execution environment of the identity provider server, the contents to confirm authentication of the principal device by the service provider server.

In at least some embodiments, the method further comprises decrypting, by the trusted execution environment of the service provider server, an encrypted ticket comprised in the authentication request using an identity provider key, the encrypted ticket generated by encrypting the service provider key.

In at least some embodiments, obtaining the signature comprises generating, by the trusted execution environment of the service provider server, the signature using at least one random number.

In at least some embodiments, the method further comprises generating, by the trusted execution environment of the service provider server, the at least one symmetric key from a first random number and the service provider key.

In at least some embodiments, generating the at least one symmetric key comprises deriving a first symmetric key and a second symmetric key from the first random number and the service provider key.

In at least some embodiments, the authenticated encryption message comprises a cipher text and a message authentication code, and the cipher text is derived from a second random number.

In at least some embodiments, decrypting and verifying the authenticated encryption message comprises: decrypting the cipher text using the first symmetric key to obtain the second random number; decrypting the message authentication code using the second symmetric key; verifying the message authentication code using the cipher text; and verifying the second random number using the at least one random number used in generating the signature.

In accordance with another broad aspect, there is provided a service provider server comprising a processing unit and a memory having stored thereon program instructions. The program instructions are executable by the processing unit for performing the method of registering a principal device to the service provider server as described above, in accordance with any of the described embodiments.

BRIEF DESCRIPTION OF THE DRAWINGS

Further features and advantages of embodiments described herein may become apparent from the following detailed description, taken in combination with the appended drawings which are briefly described hereinbelow.

It will be noted that throughout the appended drawings, like features are identified by like reference numerals.

DETAILED DESCRIPTION OF ILLUSTRATIVE EMBODIMENTS

Methods and systems for implementing authentication protocols based on trusted execution environments are described herein. More specifically, authentication protocols are described herein for authenticated communications between a principal device, an identity provider server and a service provider server.

Figure 1A:
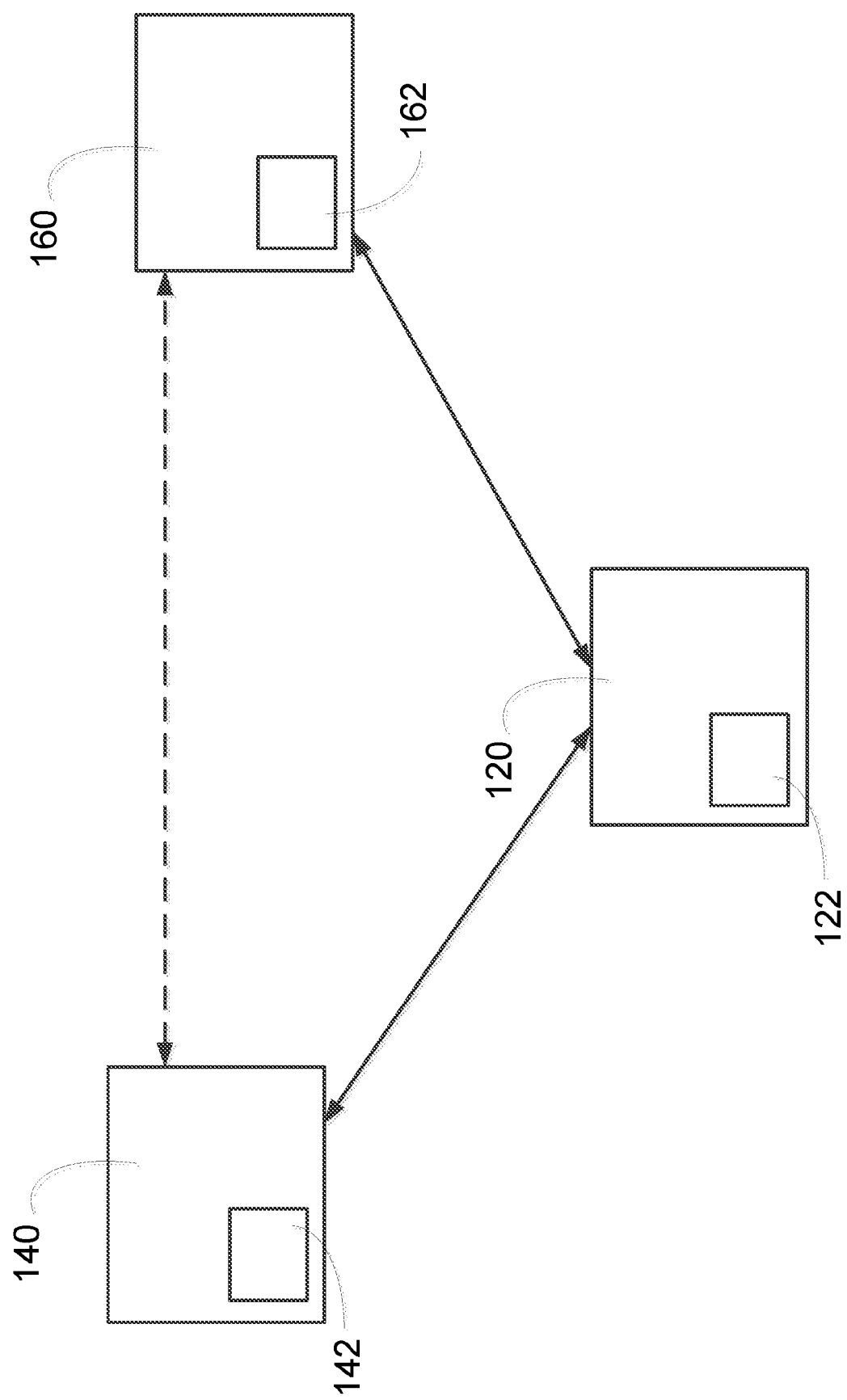
FIG. 1A is a first example embodiment of a setup for authenticated communication between a principal device, an identity provider server and a service provider server.

With reference to FIG. 1A, there is shown an example embodiment for authenticated communications between a principal device 120, an identity provider server 140 and a service provider server 160. The principal device 120, the identity provider server 140 and the service provider server 160 communicate together over one or more networks, such as a public network, a Wi-Fi network, a ZigBee™ network, a Bluetooth™ network, a local-area network (LAN), a wide-area network (WAN), a wireless network, a mobile communication network, or any other suitable network. In accordance with some embodiments, the network is the Internet.

The principal device 120 may be any suitable networked device, such as a mobile phone, a smartphone, a tablet, a portable computer, a desktop computer, a wearable communication device, or any other suitable device. The principal device 120 is associated with a trusted execution environment (TEE). In some embodiments, as illustrated in FIG. 1A, the principal device 120 includes a principal TEE 122. The principal TEE 122 is a secure execution environment protected by dedicated hardware of the principal device 120. The principal TEE 122 may be any commercially available secure execution environment such as SGX™ (provided by Intel™), inSe™ (provided by Huawei™), TrustZone™ (provided by ARM™) or any other suitable secure execution environment.

In order for there to be secure communication between the principal device 120 and the service provider server 160, the principal device 120 is registered and authenticated by the identity provider server 140 and is authenticated by the service provider server 160.

The identity provider server 140 may be one or more computers, a server cluster, a computer cluster, or any other suitable configuration of one or more devices. The identity provider server 140 is associated with an identity provider TEE 142. The identity provider TEE 142 is a secure execution environment protected by dedicated hardware of the identity provider server 140. The identity provider TEE 142 may be any commercially available secure execution environment, as described elsewhere in this document. The identity provider server 140 is for identifying the user associated with the principal device 120 and for authenticating the principal device 120 to allow for secure communication between the principal device 120 and the service provider server 160.

The service provider server 160 may be one or more computers, a server cluster, a computer cluster, or any other suitable configuration of one or more devices. The service provider server 160 is associated with a service provider TEE 162. The service provider TEE 162 is a secure execution environment protected by dedicated hardware of the service provider server 160. The service provider TEE 162 may be any commercially available secure execution environment, as described elsewhere in this document. The service provider server 160 is for providing a service to the principal device 120. For example, the service provider server 160 may provide a website or a web service for the principal device 120 to securely communicate therewith.

Figure 1B:
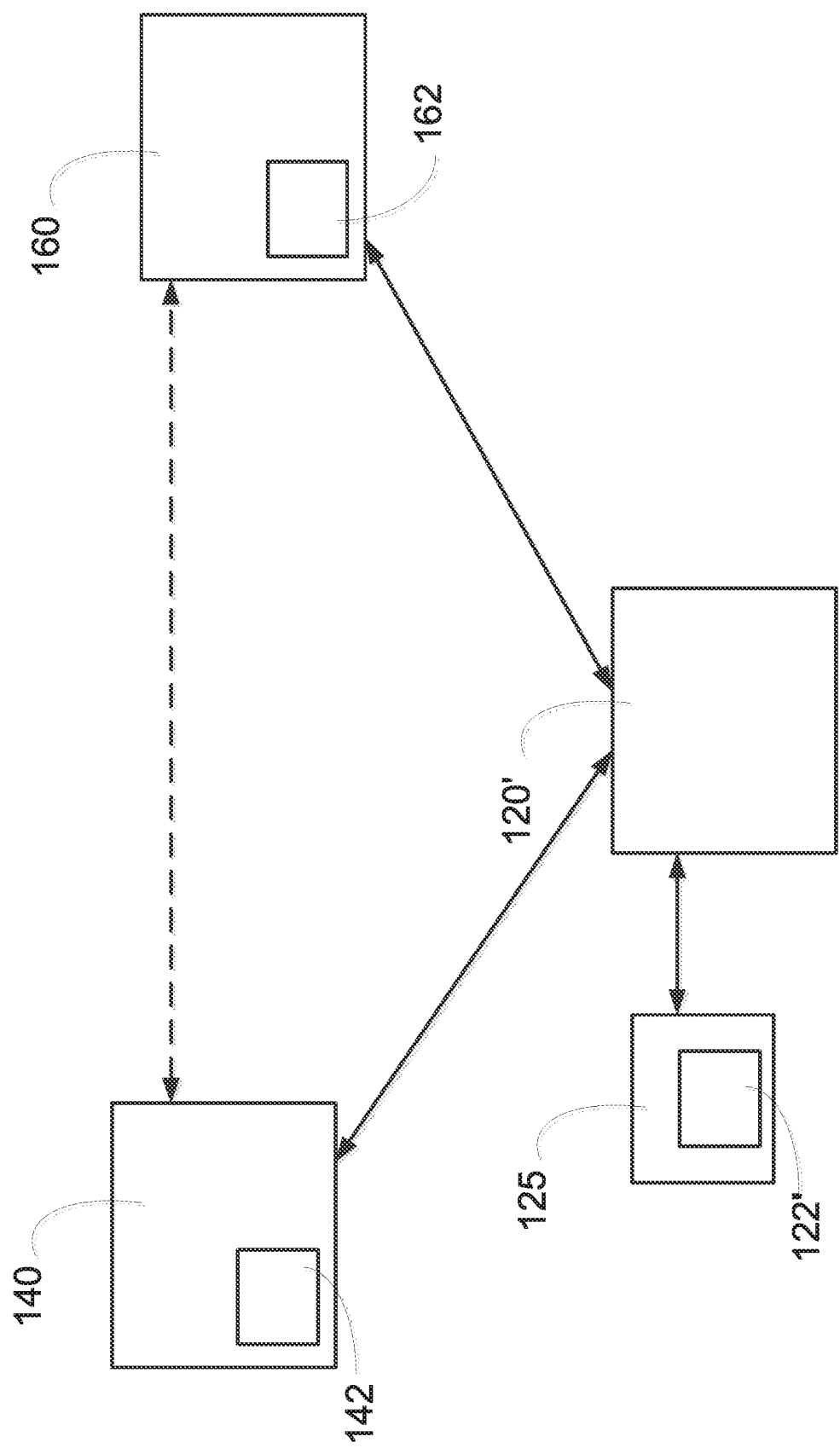
FIG. 1B is a second example embodiment of a setup for authenticated communication between a principal device, an identity provider server and a service provider server.

In some embodiments, the TEE associated with the principal device 120 is provided by a secondary device. With reference to FIG. 1B, there is shown another example embodiment for authenticated communications between a principal device 120', the identity provider server 140 and the service provider server 160. The principal device 120' is a variant of the principal device 120. In this example, the principal device 120' does not include a TEE. Rather, in this example, the principal device 120' is associated with a secondary device 125 including a secondary TEE 122'. The secondary TEE 122' is a secure execution environment protected by dedicated hardware of the secondary device 125. The secondary TEE 122' may be any commercially available secure execution environment, as described elsewhere in this document.

The secondary device 125 may be any suitable device, such as a mobile phone, a smartphone, a tablet, a portable computer, a desktop computer, a wearable communication device, or any other suitable device. The secondary device 125 may be communicatively coupled to the principal device 120' to form a secure connection therebetween. The secure connection between the secondary device 125 and the principal device 120' may be a connection over a public network, a Wi-Fi network, a ZigBee™ network, a Bluetooth™ network, a local-area network (LAN), a wide-area network (WAN), a wireless network, a mobile communication network, or any other suitable network connection. The connection may be over the Internet.

Examples are provided herein with reference to the principal device 120 and the principal TEE 122; however, these examples are applicable to the principal device 120' and the secondary TEE 122'. In other words, the steps described herein to be performed by the principal TEE 122 may be performed by the secondary TEE 122'. The principal device 120' may communicate input for processing by the secondary TEE 122' to the secondary device 125. The secondary device 125 may communicate output from the secondary TEE 122' to the principal device 120'.

Figure 2:
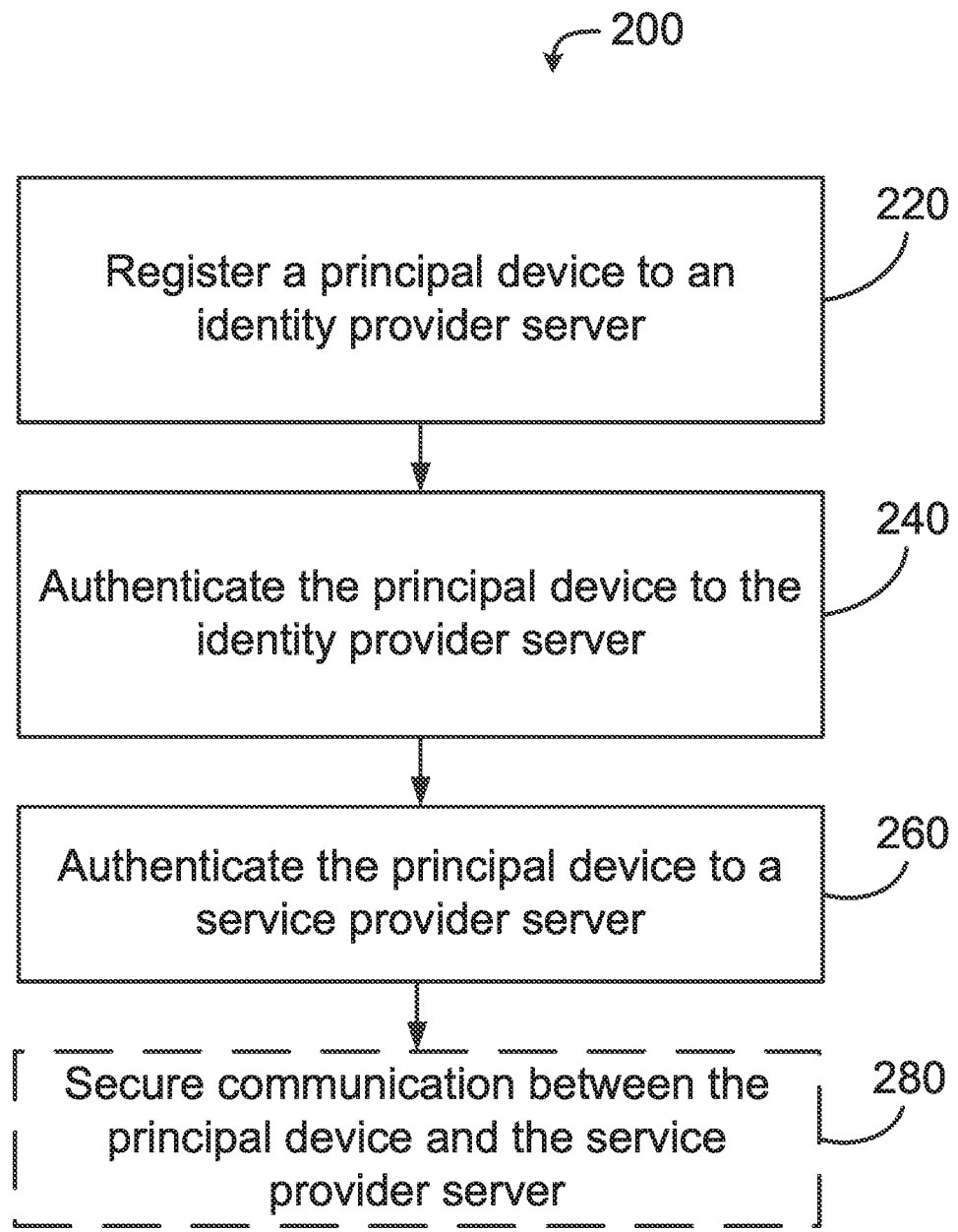
FIG. 2 is a flowchart illustrating an example method executed by a principal device for authenticated communication between the principal device, an identity provider server and a service provider server.

With reference to FIG. 2, in accordance with some embodiments, the principal device 120 implements a method 200 for registering and authenticating the principal device 120 to the identity provider server 140 and authenticating the principal device 120 to the service provider server 160. At step 220, the principal device 120 is registered to the identity provider server 140 based on the use of TEEs 122, 122', 142. At step 240, the principal device 120 is authenticated to the identity provider server 140 based on the use of TEEs 122, 122', 142. At step 260, the principal device 120 is authenticated to the service provider server 160 based on the use of TEEs 122, 122', 162. At step 280, optionally, secure communication between the principal device 120 and the service provider server 160 occurs.

Figure 3A:
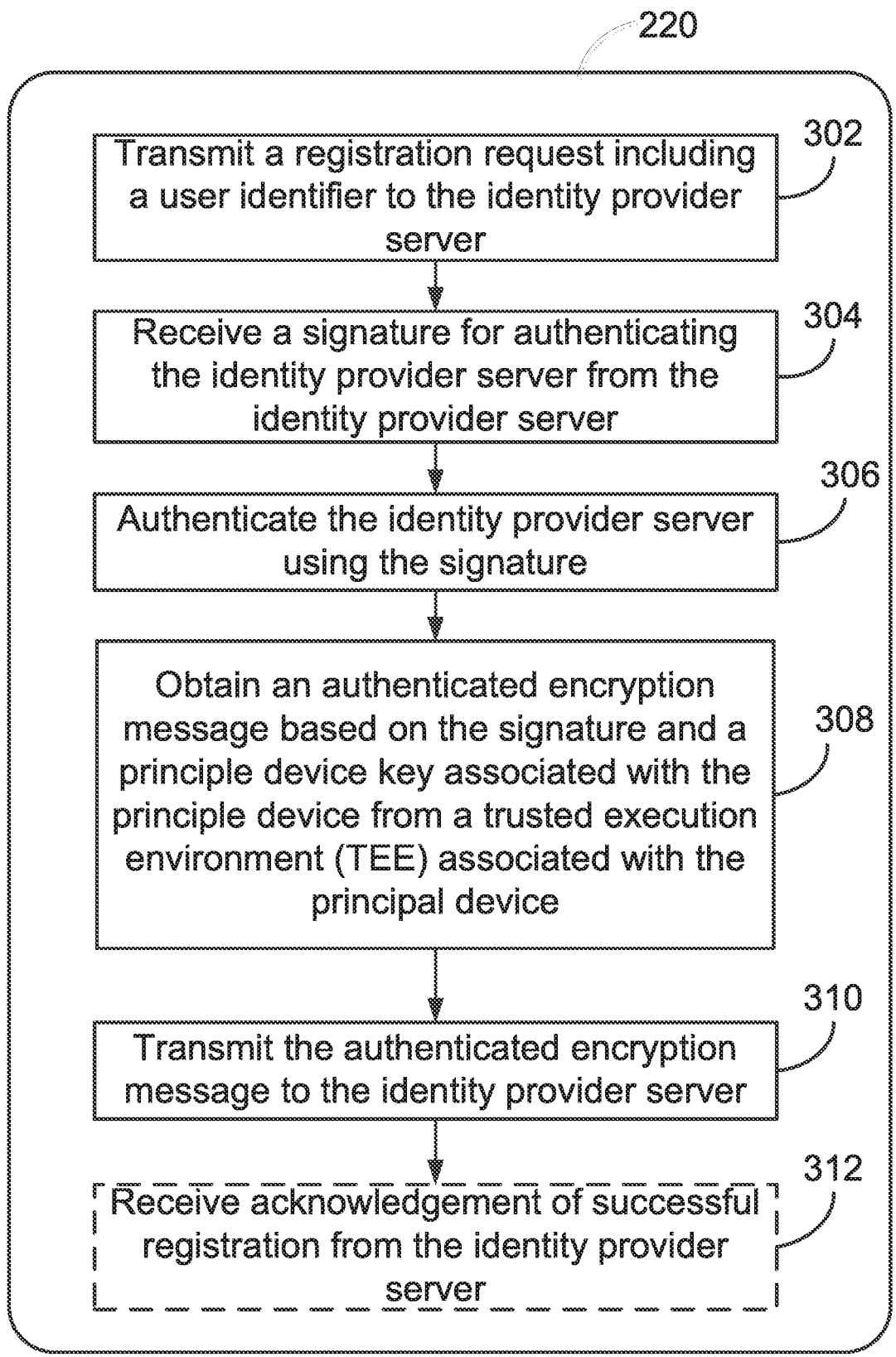
FIG. 3A is a flowchart illustrating an example embodiment for registration of a principal device to an identity provider server.

With reference to FIG. 3A, there is illustrated an example embodiment for providing a registration authentication protocol as implemented by the principal device 120, as per step 220 of FIG. 2. At step 302, the principal device 120 transmits a registration request including a user identifier $ID_p$ associated with a user of the principal device 120 to the identity provider server 140. The user identifier $ID_p$ may be any suitable identifier such as a number, a string, or any other suitable identifier. In some embodiments, the user identifier $ID_p$ is an account identifier associated with an account the user has at the identity provider server 140. In some embodiments, the user identifier $ID_p$ is one of an email address, a telephone number, a user name or any other suitable account identifier. The user identifier $ID_p$ is for identifying the user associated with the principal device 120 to the identity provider server 140.

In accordance with some embodiments, prior to execution of method 200, the user signs up for an account at the identity provider server 140. In some cases, the user provides the user identifier $ID_p$ to the identity provider server 140 during the account signup procedure. In other cases, the identity provider server 140 provides the user identifier $ID_p$ to the user upon creating the account. In some embodiments, signing up for the account includes the user providing a user password to the identity provider server 140. In other cases, the identity provider server 140 provides the user password to the user upon creating the account. In accordance with some embodiments, when the user creates the account, the user password is stored in the principal TEE 122 and the identity provider TEE 142. In some embodiments, a hash of the password Hash(PWD) is stored in the principal TEE 122 and the identity provider TEE 142 instead of the user password.

At step 304, the principal device 120 receives a registration signature for authenticating the identity provider server 140 to the principal device 120 from the identity provider server 140. The registration signature may be any suitable electronic or digital signature for authenticating the identity provider server 140 to the principal device 120. In some embodiments, the registration signature is generated using at least one random number and is signed by a private key SKi associated with the identity provider server 140. The registration signature is generated by the identity provider TEE 142. By way of a specific and non-limiting example, the registration signature can be represented by SignR(RNDR$_1$, RNDR$_2$)SKi, and is a signature of a first random number RNDR$_1$ and a second random number RNDR$_2$, signed by the private key SKi.

At step 306, the principal device 120 authenticates the identity provider server 140 using the registration signature.

Figure 3B:
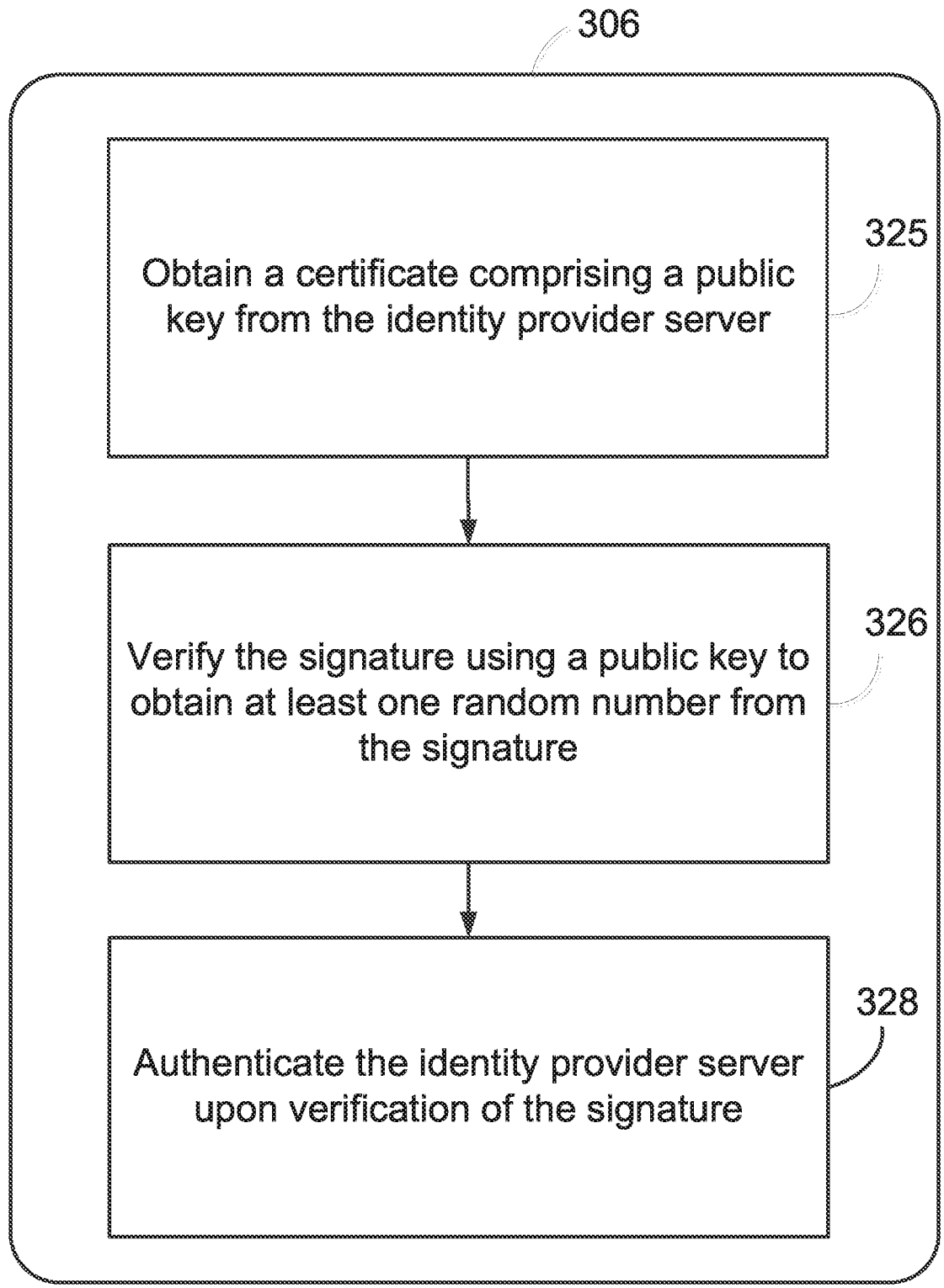
FIG. 3B is a flowchart illustrating an example embodiment for authenticating the identity provider server using a signature during the registration process of FIG. 3A.

With reference to FIG. 3B, an example embodiment for step 306 is illustrated. At step 325, the principal device 120 obtains a certificate associated with the identity provider server 140 from the identity provider server 140. The certificate includes a public key $PK_i$ associated with the identity provider server 140. In accordance with some embodiments, the certificate is generated by the identity provider TEE 142. The public key $PK_i$ corresponds to the private key $SK_i$ such that public key $PK_i$ can be used to verify a signature signed by the private key $SK_i$.

At step 326, the registration signature is verified by use of the public key $PK_i$ associated with the identity provider server 140 to obtain at least one random number from the registration signature. In a specific and non-limiting example of implementation, the registration signature $Sign_R(RND_{R1}, RND_{R2})_{SKi}$ is verified using the public key $PK_i$ to obtain the first random number $RND_{R1}$ and the second random number $RND_{R2}$.

At step 328, upon verification of the registration signature, the identity provider server 140 is authenticated by the principal device 120.

Referring back to FIG. 3A, at step 308, an authenticated encryption message is obtained from the principal TEE 122. The authenticated encryption message is generated based on the registration signature and a principal device key $K_p$ associated with the principal device 120. The principal device key $K_p$ is generated and stored by the principal TEE 122. In accordance with some embodiments, the principal device key $K_p$ is a symmetric key.

Figure 3C:
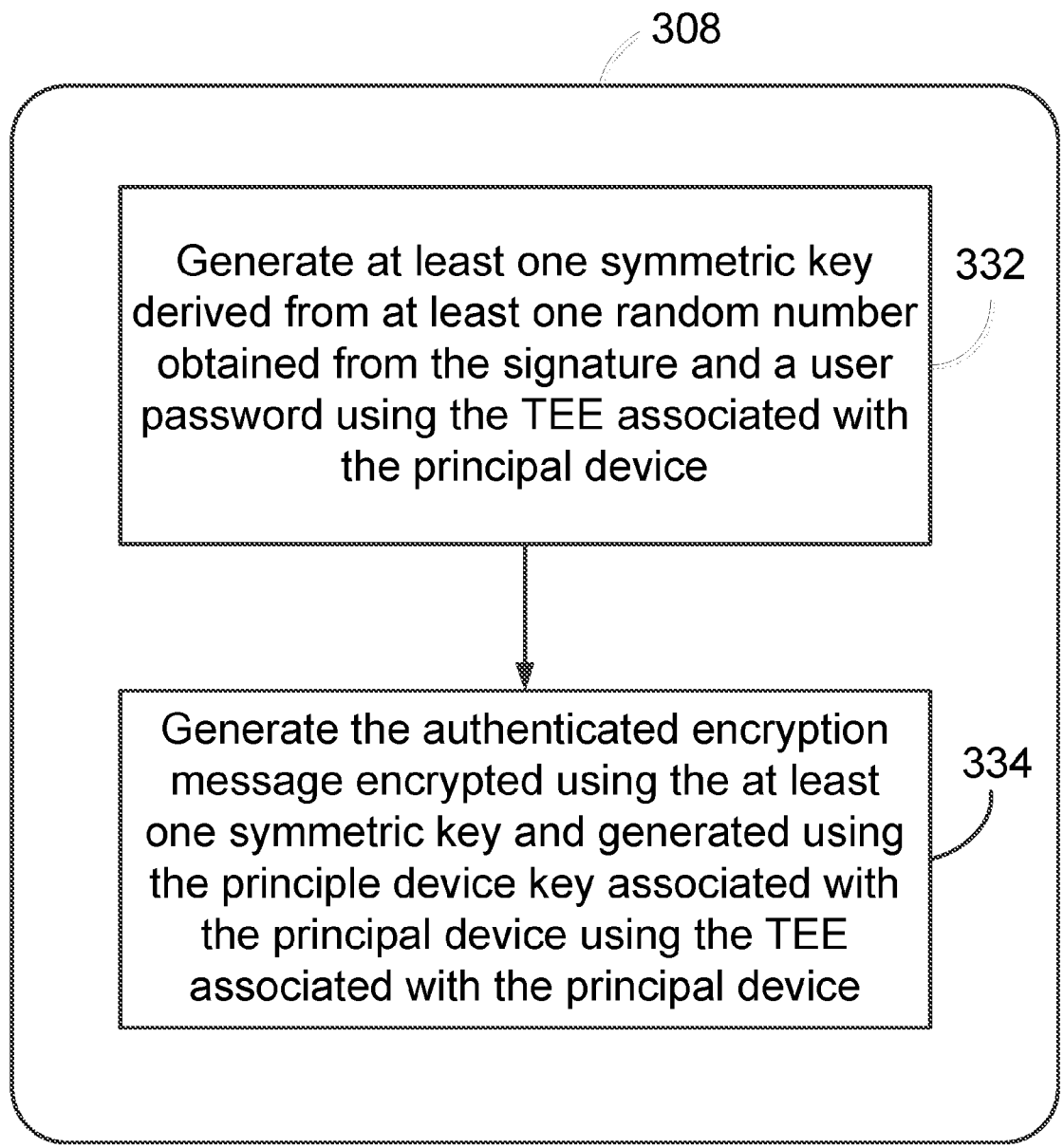
FIG. 3C is a flowchart illustrating an example embodiment for obtaining an authenticated encryption message during the registration process of FIG. 3A.

With reference to FIG. 3C, an example of step 308 is illustrated. At step 332, the principal TEE 122 generates at least one registration symmetric key. In accordance with some embodiments, the at least one registration symmetric key is derived from at least one random number obtained by decrypting the registration signature and the user password. In a specific and non-limiting example of implementation, the at least one registration symmetric key is composed of a first registration symmetric key $EK_R$ and a second registration symmetric key $AK_R$ that are derived from the first random number $RND_{R1}$ and the user password. In this example, the first registration symmetric key $EK_R$ is generated by a first key derivation function $KDF_1()$ and denoted as $EK_R = KDF_1(Hash(PWD), RND_{R1})$. Similarly, in this example, the second registration symmetric key $AK_R$ is generated by a second key derivation function $KDF_2()$ and denoted as $AK_R = KDF_2(Hash(PWD), RND_{R1})$. The key derivation functions $KDF_1()$, $KDF_2()$ may be any suitable key derivation functions that derive secret keys from secret input values. Both the principal TEE 122 and the identity provider TEE 142 use the same key derivation functions $KDF_1()$, $KDF_2()$ for generating the first registration symmetric key $EK_R$ and the second registration symmetric key $AK_R$. In accordance with an embodiment, the key derivation functions $KDF_1()$, $KDF_2()$ are provided to the principal device 120 from the identity provider server 140.

At step 334, the principal TEE 122 generates the authenticated encryption message using the at least one registration symmetric key. In a specific and non-limiting example of implementation, the authenticated encryption message is generated by deriving a cipher text $C_R$ using the first registration symmetric key $EK_R$ and deriving a message authentication code $TAG_R$ using the second registration symmetric key $AK_R$. In some embodiments, the cipher text $C_R$ is derived by encrypting the second random number $RND_2$, the principal device key $K_p$, a device identifier $ID_{p\_dev}$ associated with the principal device 120, and a secondary identifier associated with the user of the principal device 120. The device identifier $ID_{p\_dev}$ may be a number, a string, or any other suitable identifier. In some embodiments, the device identifier $ID_{p\_dev}$ is one of a serial number, a telephone number, an IP address or any other suitable identifier. The device identifier $ID_{p\_dev}$ may be provided, for example, by a manufacturer or distributor of the principal device 120. In some embodiments, the secondary identifier associated with the user of the principal device 120 is a multi-factor identifier MF such as a personal identification number, a numeric and/or alphanumeric password or code, a biometric identifier (e.g., finger print, retina scan, face scan and the like) and/or any other suitable secondary identifier. In some embodiments, the message authentication code $TAG_R$ is derived from the second random number $RND_2$, the principal device key $K_p$, the device identifier $ID_{p\_dev}$ and the secondary identifier. The message authentication code $TAG_R$ is for confirming that the authenticated encryption message came from the principal device 120. By way of a specific and non-limiting example, the authenticated encryption message is denoted as $(C_R, TAG_R)$. In this example, the cipher text $C_R$ is denoted as $C_R = E(RND_{R2}, K_p, ID_{p\_dev}, MF)_{EK_R}$ and the message authentication code $TAG_R$ is denoted as $TAG_R = MAC(RND_{R2}, K_p, ID_{p\_dev}, MF)_{AK_R}$. E( ) is an encryption function and MAC( ) is a message authentication code function that are used in combination for generating authenticated encryption messages.

Referring back to FIG. 3A, at step 310, the principal device 120 transmits the authenticated encryption message to the identity provider server 140. The authenticated encryption message is for registering the principal device 120 to the identity provider server 140. In some embodiments, at step 312, the principal device 120 receives from the identity provider server 140 acknowledgement of successful registration.

In some embodiments, in step 220, a connection between the principal device 120 and the identity provider server 140 is over a transport layer security (TLS) channel, or any other suitable connection.

It should be appreciated that in step 220, the principal device 120 provides the principal device key $K_p$ to the identity provider server 140 such that the principal device key $K_p$ may be used for secure communication between the principal device 120 and the identity provider server 140.

Figure 4A:
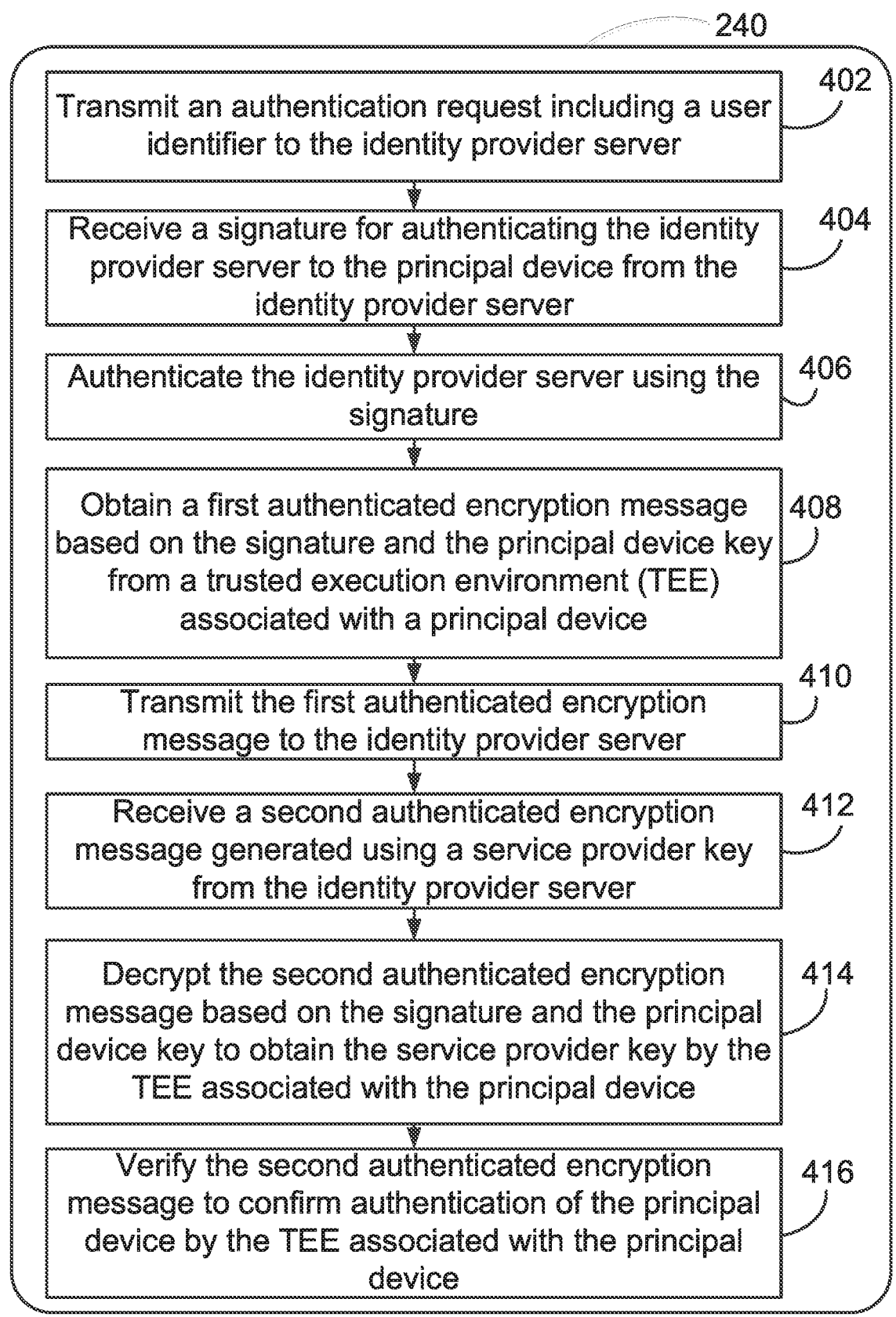
FIG. 4A is a flowchart illustrating an example embodiment for authentication of a principal device to an identity provider server.

With reference to FIG. 4A, there is illustrated an example embodiment of step 240 for authenticating the principal device 120 to the identity provider server 140. At step 402, the principal device 120 transmits an authentication request including the user identifier $ID_p$ to the identity provider server 140.

At step 404, the principal device 120 receives an authentication signature from the identity provider server 140. The authentication signature is for authenticating the identity provider server 140 to the principal device 120. The authentication signature may be any suitable electronic or digital signature for authenticating the identity provider server 140 to the principal device 120. In some embodiments, the authentication signature is generated using at least one random number and is signed by the private key $SK_i$. The authentication signature is generated by the identity provider TEE 142. By way of a specific and non-limiting example, the authentication signature can be represented by $Sign_A(RND_{A1}, RND_{A2})_{SKi}$, and is a signature of a first random number $RND_{A1}$ and a second random number $RND_{A2}$, signed by the private key $SK_i$.

Figure 4B:
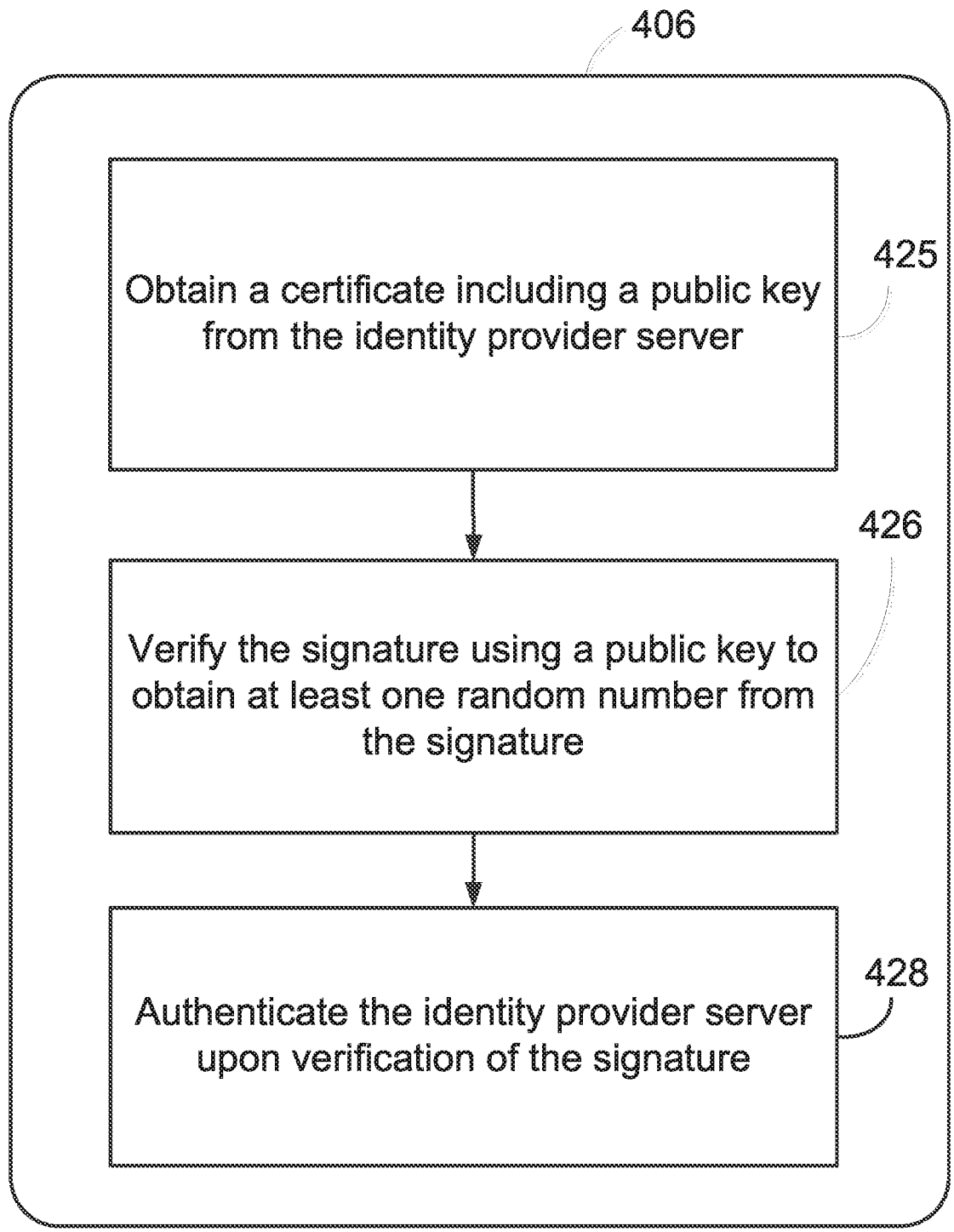
FIG. 4B is a flowchart illustrating an example embodiment for authenticating the identity provider server using a signature during the authentication process of FIG. 4A.

At step 406, the identity provider server 140 is authenticated by the principal device 120 using the authentication signature. With reference to FIG. 4B, there is illustrated an example embodiment for step 406. At step 425, the principal device 120 obtains the certificate including the public key $PK_i$ from the identity provider server 140. At step 426, the authentication signature is verified using the public key $PK_i$ to obtain the at least one random number from the authentication signature. In a specific and non-limiting example of implementation, the first random number $RND_{A1}$ and the second random number $RND_{A2}$ are obtained from the authentication signature $Sign_A(RND_{A1},RND_{A2})_{Ski}$ by verifying the authentication signature $Sign_A(RND_{A1},RND_{A2})_{Ski}$ using the public key $PK_i$.

At step 428, upon verification of the authentication signature, the identity provider server 140 is authenticated by the principal device 120.

Referring back to FIG. 4A, at step 408, a first authenticated encryption message is obtained from the principal TEE 122. The first authenticated encryption message is based on the authentication signature and the principal device key $K_p$.

Figure 4C:
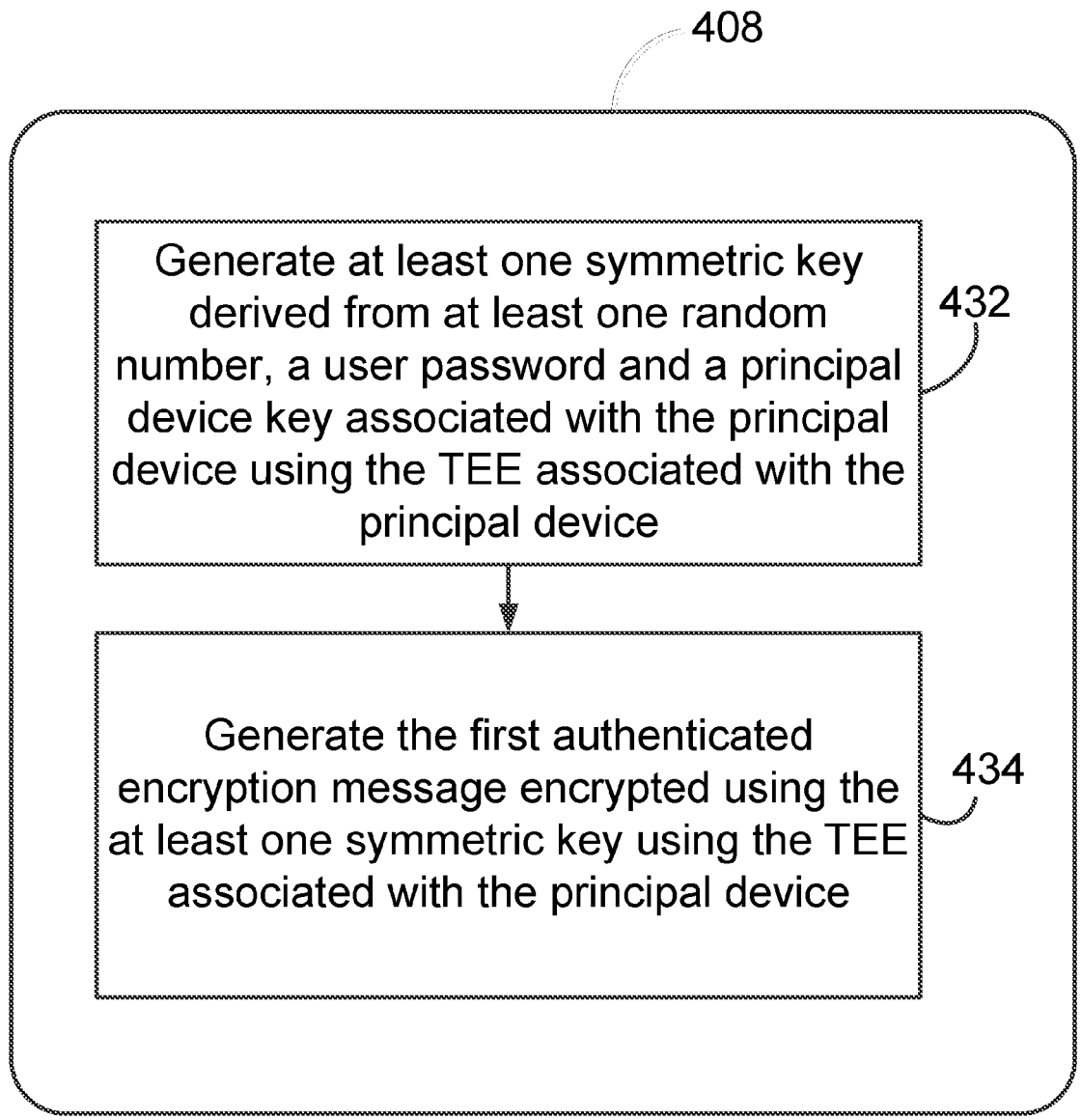
FIG. 4C is a flowchart illustrating an example embodiment for obtaining an authenticated encryption message during the authentication process of FIG. 4A.

With reference to FIG. 4C, there is illustrated an example embodiment of step 408. At step 432, the principal TEE 122 generates at least one authentication symmetric key. In accordance with some embodiments, the at least one authentication symmetric key is derived from at least one random number obtained from the authentication signature, the user password and the principal device key $K_p$. In a specific and non-limiting example of implementation, the at least one authentication symmetric key is a first authentication symmetric key $EK_A$ and a second authentication symmetric key $AK_A$ that are derived from the first random number $RND_{A1}$, the user password, the principal device key $K_p$, and the secondary identifier. In this example, the first authentication symmetric key $EK_A$ is generated by the first key derivation function $KDF_1(\ )$ and denoted as $EK_A=KDF_1(Hash(PWD), RND_{A1}, K_p, MF)$. Similarly, in this example, the second authentication symmetric key $AK_A$ is generated by the second key derivation function $KDF_2(\ )$ and denoted as $AK_A=KDF_2(Hash(PWD), RND_{A1}, K_p, MF)$. Both the principal TEE 122 and the identity provider TEE 142 use the same key derivation functions $KDF_1(\ )$, $KDF_2(\ )$ for generating the first authentication symmetric key $EK_A$ and the second authentication symmetric key $AK_R$.

At step 434, the principal TEE 122 generates the first authenticated encryption message. The first authenticated encryption message is generated using the at least one authentication symmetric key. In a specific and non-limiting example of implementation, the first authenticated encryption message is generated by deriving a first cipher text $C_{A1}$ using the first authentication symmetric key $EK_A$ and deriving a first message authentication code $TAG_{A1}$ using the second authentication symmetric key $AK_A$. In this example, the first cipher text $C_{A1}$ is derived by encrypting the second random number $RND_{A2}$ and the first message authentication code $TAG_{A1}$ is derived from the second random number $RND_{A2}$. The first message authentication code $TAG_{A1}$ is for confirming that the first authenticated encryption message came from the principal device 120. By way of a specific and non-limiting example, the first authenticated encryption message may be denoted as $(C_{A1}, TAG_{A1})$. In this example, the first cipher text $C_{A1}$ is denoted as $C_{A1}=E(RND_{R2})_{EK_A}$ and the first message authentication code $TAG_{A1}$ is denoted as $TAG_{A1}=MAC(RND_{R2})_{AK_A}$.

Referring back to FIG. 4A, at step 410, the principal device 120 transmits the first authenticated encryption message to the identity provider server 140. The first authenticated encryption message is for authenticating the principal device 120 to the identity provider server 140.

At step 412, the principal device 120 receives a second authenticated encryption message from the identity provider server 140. The second authenticated encryption message is generated by encrypting a service provider key $K_{ps}$. The service provider key $K_{ps}$ is for communication between the service provider server 160 and the principal device 120. The second authenticated encryption message is encrypted using the at least one authentication symmetric key. In accordance with some embodiments, the service provider key $K_{ps}$ is a symmetric key. In accordance with some embodiments, the second authenticated encryption message is generated by encrypting an encrypted ticket T, which is generated by encrypting the service provider key $K_{ps}$. In some embodiments, the encrypted ticket T is encrypted by the identity provider TEE 142 using an identity provider key $K_{sp}$. In a specific and non-limiting example of implementation, the second authenticated encryption message is generated by encrypting the service provider key $K_{ps}$ and the encrypted ticket T.

In a specific and non-limiting example of implementation, the second authenticated encryption message includes a second cipher text $C_{A2}$ and a second message authentication code $TAG_{A2}$. In this example, the second cipher text $C_{A2}$ is derived by encrypting the service provider key $K_{ps}$ and the encrypted ticket T. In this example, the second cipher text $C_{A2}$ is encrypted using the first authentication symmetric key $EK_A$ and the second message authentication code $TAG_{A2}$ is encrypted using the second symmetric key $AK_A$. For example, the second authenticated encryption message may be denoted as $(C_{A2}, TAG_{A2})$, the second cipher text $C_{A2}$ may be denoted as $C_{A2}=E(K_{ps}, T)_{EK_A}$ and the second message authentication code $TAG_{A2}$ may be denoted as $TAG_{A2}=MAC(K_{ps}, T)_{AK_A}$.

At step 414, the principal TEE 122 decrypts the second authenticated encryption message. Decrypting of the second authenticated encryption message is based on the authentication signature and the principal device key $K_p$ to obtain the service provider key $K_{ps}$ from the second authentication encryption message. In accordance with some embodiments, decrypting the second authenticated encryption message includes using the at least one authentication symmetric key to obtain the service provider key $K_{ps}$ and the encrypted ticket T.

In a specific and non-limiting example of implementation, decrypting the second authenticated encryption message $(C_{A2}, TAG_{A2})$ includes decrypting the second cipher text $C_{A2}$ using the first symmetric key $EK_A$ to obtain the service provider key $K_{ps}$ and the encrypted ticket T and decrypting the second message authentication code $TAG_{A2}$ using the second symmetric key $AK_A$.

At step 416, the principal TEE 122 verifies the service provider key $K_{ps}$ to confirm authentication of the principal device to the identity provider server 140. In accordance with some embodiments, verification of the service provider key $K_{ps}$ to confirm authentication of the principal device 120 to the identity provider server 140 includes verifying that the second authenticated encryption message is authentic. For example, the second authenticated encryption message $(C_{A2}, TAG_{A2})$ can be verified by verifying the corresponding plain text of the second cipher text $C_{A2}$ using the decrypted second message authentication code $TAG_{A2}$. Upon verification, the principal device key $K_p$ and the encrypted ticket T are stored in the principal TEE 122.

In some embodiments, in step 240, a connection between the principal device 120 and the identity provider server 140 is over a transport layer security (TLS) channel, or any other suitable connection.

It should be appreciated that in step 240, the principal device 120 receives the service provider key $K_{ps}$ from the identity provider server 140. The service provider key $K_{ps}$ is for communicating between the service provider server 160 and the principal device 120. The service provider key $K_{ps}$ is used for authenticating the principal device 120 to the service provider server 160.

Figure 5A:
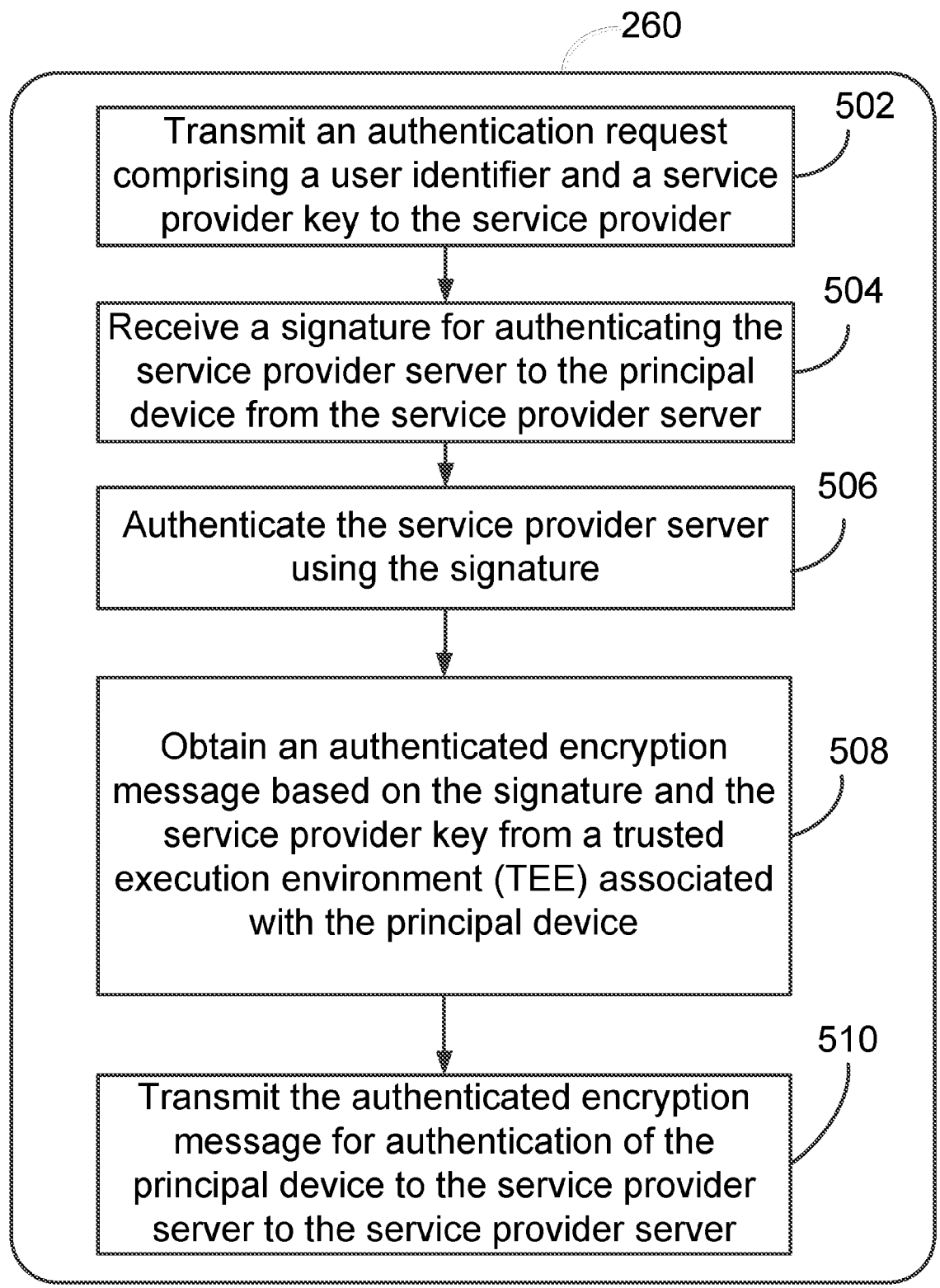
FIG. 5A is a flowchart illustrating an example embodiment for authentication of a principal device to a service provider server.

With reference to FIG. 5A, there is illustrated an example embodiment of step 260 for authenticating the principal device 120 to the service provider server 160, as implemented by the principal device 120.

At step 502, the principal device 120 transmits a service provider authentication request including the user identifier $ID_p$ and the service provider key $K_{ps}$ to the service provider server 160. In accordance with a specific and non-limiting example of implementation, the service provider authentication request includes the encrypted ticket T generated by encrypting the service provider key $K_{ps}$. In other words, the service provider key $K_{ps}$ is provided by the authentication request in the form of the encrypted ticket T. In this example, the encrypted ticket T was provided to the principal device 120 when the principal device 120 was authenticated by the identity provider server 140.

At step 504, the principal device 120 receives a signature for authenticating the service provider server 160 to the principal device 120 from the service provider server 160. The signature may be any suitable electronic or digital signature for authenticating the identity provider server 140 to the principal device 120. In some embodiments, the signature is generated using at least one random number and is signed by a service provider private key $SK_s$ associated with the service provider server 160. In accordance with some embodiments, the signature is generated by the service provider TEE 162. By way of a specific and non-limiting example, the signature can be represented by $\text{Sign}(RND_1, RND_2)_{SK_s}$ and is a signature of a first random number $RND_1$ and a second random number $RND_2$, signed by the private key $SK_i$.

Figure 5B:
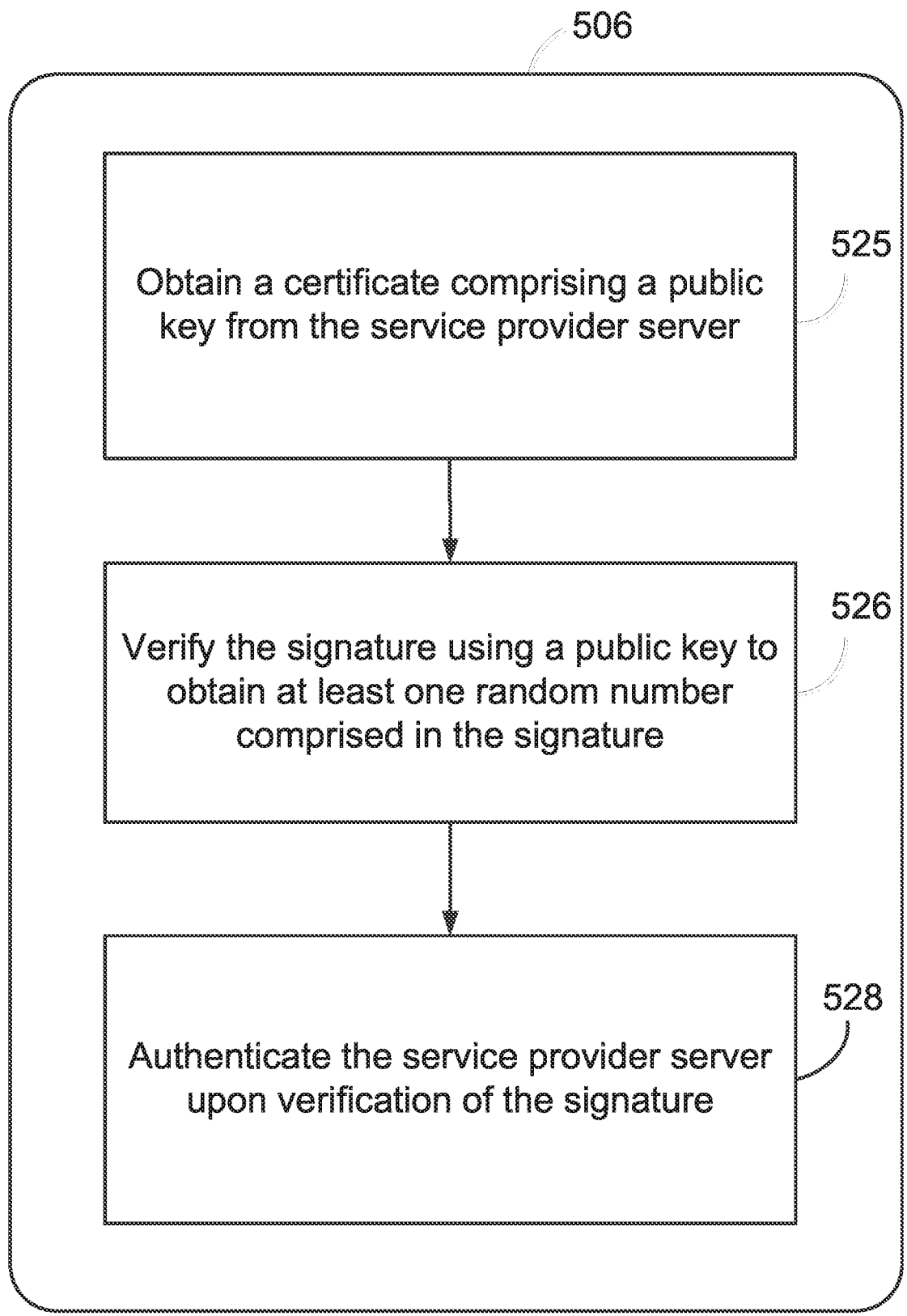
FIG. 5B is a flowchart illustrating an example embodiment for authenticating the service provider server using a signature during the authentication process of FIG. 5A.

At step 506, the principal device 120 authenticates the service provider server 160 using the signature. With reference to FIG. 5B, there is illustrated an example embodiment of step 506. At step 525, the principal device 120 obtains a service provider certificate associated with the service provider server 160 from the service provider server 160. The service provider certificate includes a service provider public key $PK_s$ associated with the service provider server 160. In accordance with some embodiments, the certificate is generated by the service provider TEE 162. The service provider public key $PK_s$ corresponds to the service provider private key $SK_s$ such that service provider public key $PK_s$ can be used to verify a signature signed by the service provider private key $SK_s$.

At step 526, the signature is verified using a service provider public key $PK_s$ associated with the service provider server 160 to obtain at least one random number from the signature. In a specific and non-limiting example of implementation, the first random number $RND_1$ and the second random number $RND_2$ are obtained from the signature $\text{Sign}(RND_1,RND_2)_{SK_s}$ by verifying the signature $\text{Sign}(RND_1,RND_2)_{SK_s}$ using the service provider public key $PK_s$.

At step 528, upon verification of the signature, the service provider server 140 is authenticated by the principal device 120.

Referring back to FIG. 5A, at step 508, an authenticated encryption message is obtained from the principal TEE 122. The authenticated encryption message is generated based on the signature and the service provider key $K_{ps}$.

Figure 5C:
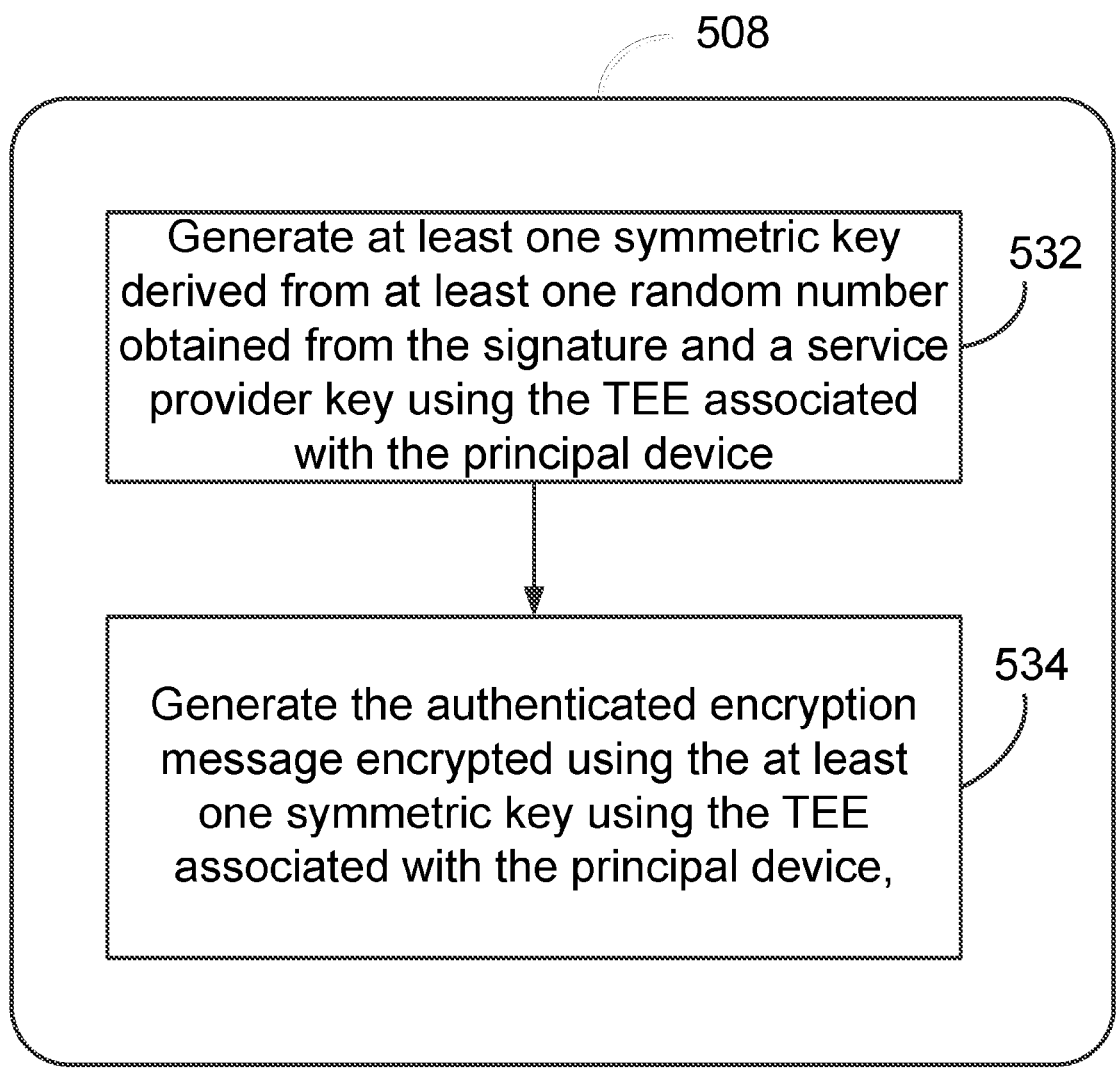
FIG. 5C is a flowchart illustrating an example embodiment for obtaining an authenticated encryption message during the authentication process of FIG. 5A.

With reference to FIG. 5C, there is illustrated an example embodiment of step 508. At step 532, the principal TEE 122 generates at least one symmetric key. In accordance with some embodiments, the at least one symmetric key is derived from at least one random number obtained by decrypting the signature, and from the service provider key $K_{ps}$. In a specific and non-limiting example of implementation, the at least one symmetric key is a first symmetric key EK and a second symmetric key AK that are derived from the first random number $RND_1$ and the service provider key $K_{ps}$. In this example, the first symmetric key EK is generated by a first key derivation function KDF( ), and denoted as $EK=KDF_1(RND_1, K_{ps})$. Similarly, in this example, the second symmetric key AK is generated by a second key derivation function KDF( )$_Q$ and denoted as $AK=KDF_2(RND_1, K_{ps})$. Both the principal TEE 122 and the service provider TEE 162 use the key derivation functions $KDF_1( )$, $KDF_2( )$ for generating the first symmetric key EK and the second symmetric key AK.

At step 534, the principal TEE 122 generates the authenticated encryption message. The authenticated encryption message is generated using the at least one symmetric key. In a specific and non-limiting example of implementation, the authenticated encryption message is generated by deriving a cipher text C using the first symmetric key EK and deriving a message authentication code TAG using the second symmetric key AK. In some embodiments, the cipher text C is derived by encrypting the second random number $RND_2$. In some embodiments, the message authentication code is derived from the second random number $RND_2$. By way of a specific and non-limiting example, the authenticated encryption message is denoted as (C, TAG), the cipher text C is denoted as $C=E(RND_2)_{EK}$ and the message authentication code is denoted as $TAG=MAC(RND_2)_{AK}$.

Referring back to FIG. 5A, at step 510, the principal device 120 transmits the authenticated encryption message to the service provider server 160. The authenticated encryption message is for authentication of the principal device 120 by the service provider server 160.

In some embodiments, in step 260, a connection between the principal device 120 and the service provider server 160 is over a transport layer security (TLS) channel, or any other suitable connection.

It should be appreciated that in step 260 the principal device 120 provides the service provider key $K_{ps}$ to the service provider server 160 such that the service provider key $K_{ps}$ may be used for secure communication between the principal device 120 and the service provider server 140 at step 280.

Figure 6:
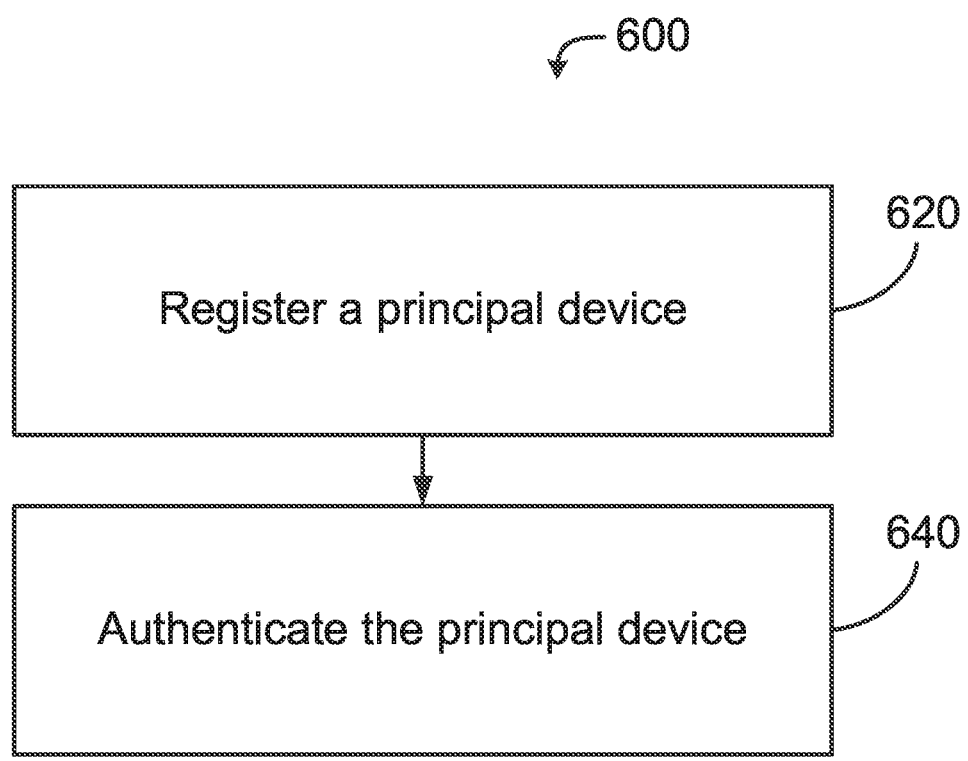
FIG. 6 is a flowchart illustrating an example method executed by an identity provider server for authenticated communication between a principal device and the identity provider server.

With reference to FIG. 6, in accordance with some embodiments, the identity provider server 140 implements a method 600 for registering and authenticating the principal device 120. At step 620, the identity provider server 140 registers the principal device 120 based on the use of TEEs 122, 122', 142. At step 640, the identity provider server 140 authenticates the principal device 120 based the use of TEEs 122, 122', 142.

Figure 7:
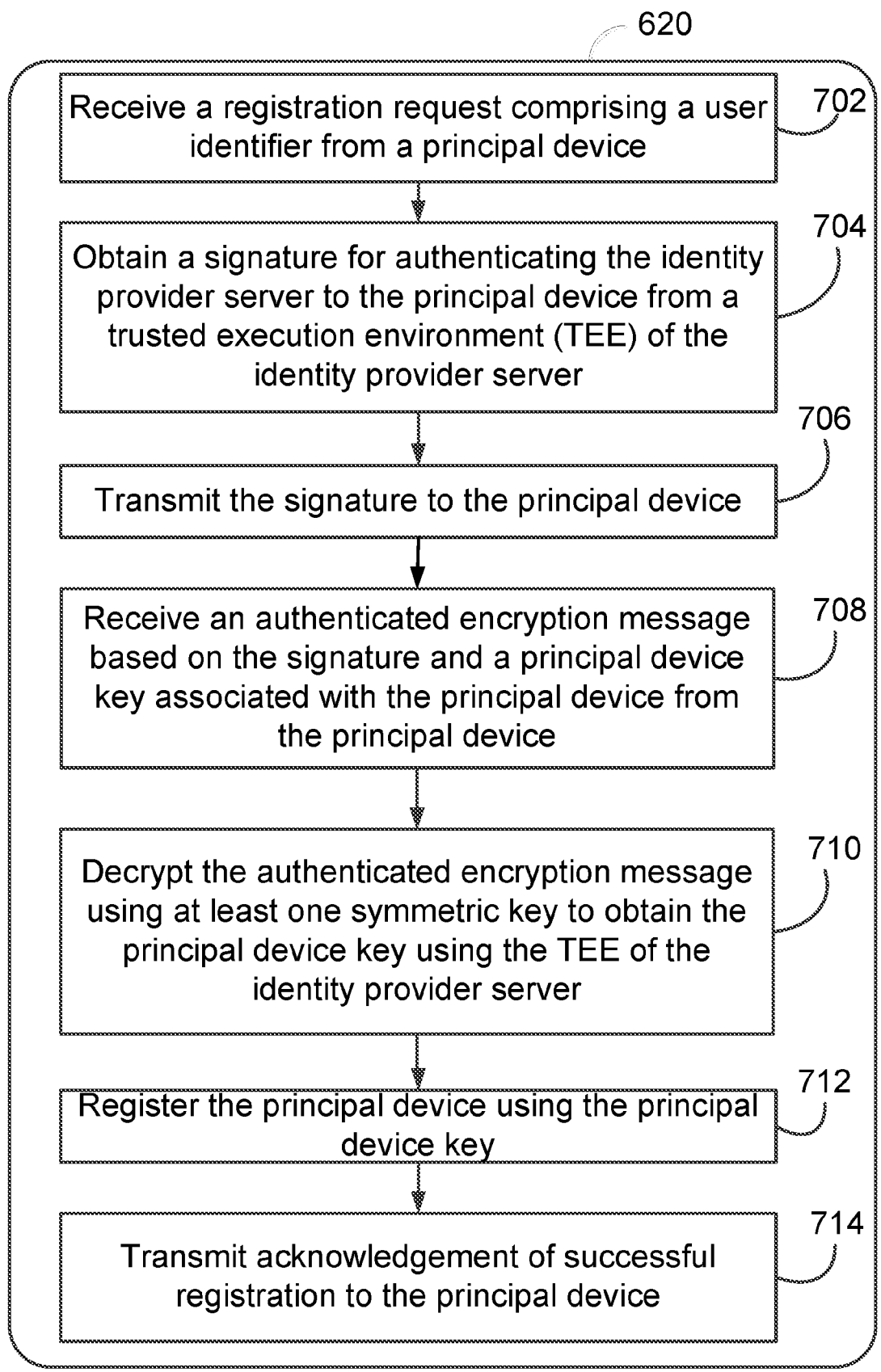
FIG. 7 is a flowchart illustrating an example embodiment for registration of a principal device by an identity provider server.

With reference to FIG. 7, there is illustrated an example embodiment of step 620, for registering the principal device 120 to the identity provider server 140, as implemented by the identity provider server 140. At step 702, the identity provider server 140 receives from the principal device 120, the registration request including the user identifier $ID_p$. In accordance with some embodiments, the identity provider server 140 uses the user identifier $ID_p$ to identify the user associated with the principal device 120. For example, the user identifier $ID_p$ can be used to identify the account associated with the user at the identity provider server 140.

At step 704, the identity provider TEE 142 generates the registration signature and the identity provider server 140 obtains the registration signature from the identity provider TEE 142. The registration signature is for authenticating the identity provider server 140 to the principal device 120. In some embodiments, the registration signature is generated using at least one random number and is signed by the private key $SK_i$. For example, prior to performance of step 704, the identity provider TEE 142 generates the private key $SK_i$ and corresponding public key $PK_i$, and stores the private key $SK_i$ in the identity provider TEE 142. In accordance with some embodiments, the identity provider TEE 142 generates the certificate including the public key $PK_i$ and the identity provider server 140 provides the certificate to the principal device 120. The private key $SK_i$ and public key $PK_i$ pair may be generated at the time of deployment of the identity provider server. In some embodiments, the at least one generated random number is the first random number $RND_{R1}$ and the second random number $RND_{R2}$. The at least one generated random number may be stored in the identity provider TEE 142 in association with the user identifier $ID_p$. By way of a specific and non-limiting example, the registration signature can be represented by $Sign_R(RND_{R1}, RND_{R2})_{SKi}$, and is a signature of the first random number $RND_{R1}$ and the second random number $RND_{R2}$, signed by the private key $SK_i$.

At step 706, the identity provider server 140 transmits the registration signature to the principal device 120.

At step 708, the identity provider server 140 receives the authenticated encryption message from the principal device 120. The authenticated encryption message is generated based on the registration signature and the principal device key $K_p$. In a specific and non-limiting example of implementation, the authenticated encryption message includes the cipher text $C_R$ and the message authentication code $TAG_R$. In this example, and the cipher text $C_R$ is derived by encrypting the second random number $RND_{R2}$, the principal device key $K_p$, the device identifier $ID_{p\_dev}$ and the secondary identifier. For example, the authenticated encryption message may be denoted as $(C_R, TAG_R)$, the cipher text $C_R$ may be denoted as $C_R=E(RND_{R2}, K_p, ID_{p\_dev}, MF)_{EK_R}$ and the message authentication code $TAG_R$ may be denoted as $TAG_R=MAC(RND_{R2}, K_p, ID_{p\_dev}, MF)_{AK_R}$.

At step 710, the identity provider TEE 142 decrypts the authenticated encryption message using the at least one registration symmetric key to obtain at least the principal device key $K_p$.

The at least one registration symmetric key is generated by the identity provider TEE 142. In accordance with some embodiments, the at least one registration symmetric key is generated from the at least one random number that was encrypted by the registration signature and the user password. As previously described, in accordance with some embodiments, the user password is provided when the user creates an account at the identity provider server 140. The user password is stored in the identity provider TEE 142 in association with the user identifier $ID_p$. As such, the user password can be obtained based on the user identifier $ID_p$ provided in the registration request. In some embodiments, generating the at least one registration symmetric key includes deriving the first registration symmetric key $EK_R$ and the second registration symmetric key $AK_R$ from the first random number $RND_{R1}$ and the user password. In a specific and non-limiting example of implementation, the at least one registration symmetric key is the first registration symmetric key $EK_R$ and the second registration symmetric key $AK_R$. In this example, the first registration symmetric key $EK_R$ and the second registration symmetric key $AK_R$ are derived from the first random number $RND_{R1}$ and the user password. In this example, the first registration symmetric key $EK_R$ is generated by a first key derivation function $KDF()_1$ and denoted as $EK_R=KDF_1(Hash(PWD), RND_{R1})$. Similarly, in this example, the second registration symmetric key $AK_R$ is generated by a second key derivation function $KDF()_2$ and denoted as $AK_R=KDF_2(Hash(PWD), RND_{R1})$. The generation of the at least one registration symmetric key may be done at step 710 or may have been previously generated, for example, after receiving the registration request. The at least one registration symmetric key may be stored in the identity provider TEE 142 in association with the user identifier $ID_p$.

In a specific and non-limiting example of implementation, decrypting the authenticated encryption message $(C_R, TAG_R)$ includes decrypting the cipher text $C_R$ using the first registration symmetric key $EK_R$ to obtain the second random number $RND_2$, the principal device key $K_p$, the device identifier $ID_p$ and the secondary identifier, and includes decrypting the message authentication code $TAG_R$ using the second registration symmetric key $AK_R$. The authenticated encryption message $(C_R, TAG_R)$ is verified using the decrypted message authentication code $TAG_R$. The second random number $RND_{R2}$ obtained from the authenticated encryption message $(C_R, TAG_R)$ may be compared to the second random number $RND_{A2}$ provided in the registration signature $Sign_R(RND_{R1}, RND_{R2})_{SKi}$ to authenticate the authenticated encryption message $(C_R, TAG_R)$.

At step 712, the identity provider server 140 uses the principal device key $K_p$ to register the principal device 120. In accordance with some embodiments, at least the principal device key $K_p$ is stored in the identity provider TEE 142 in association with the user identifier $ID_p$. In some embodiments, the device identifier $ID_{p\_dev}$ and the secondary identifier are stored in the identity provider TEE 142 in association with the user identifier $ID_p$. In some embodiments, the registration protocol between the identity provider server 140 and the principal device 120 may be implemented without the use of the secondary identifier and/or the device identifier $ID_{p\_dev}$.

In some embodiments, in step 620, a connection between the principal device 120 and the identity provider server 140 is over a transport layer security (TLS) channel, or any other suitable connection.

It should be appreciated that in step 620, the principal device 120 provides to the principal device key $K_p$ to the identity provider server 140 such that the principal device key $K_p$ may be used for secure communication between the principal device 120 and the identity provider server 140.

Figure 8:
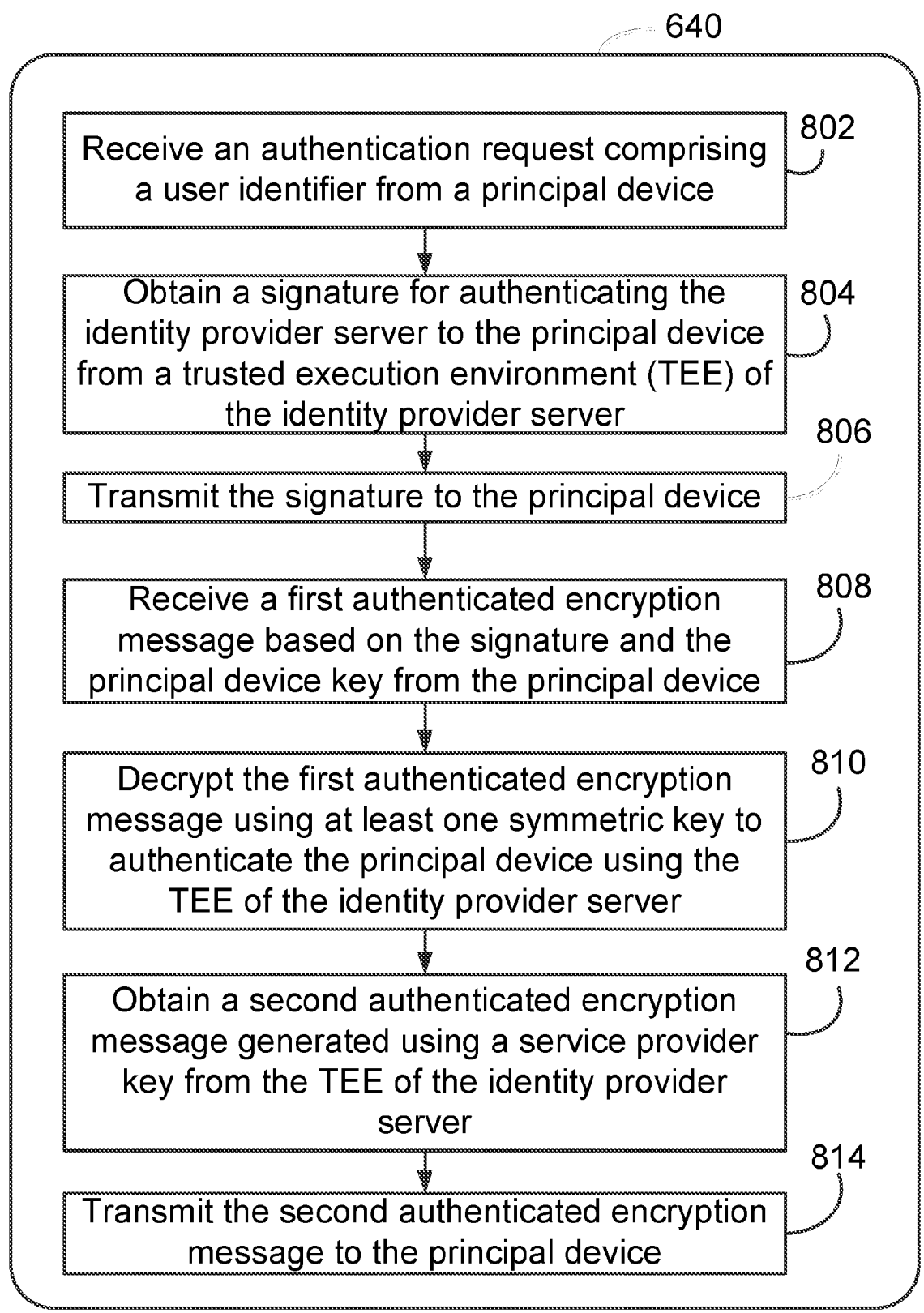
FIG. 8 is a flowchart illustrating an example embodiment for authentication of a principal device by an identity provider server.

With reference to FIG. 8, there is illustrated an example embodiment of step 640 for providing an authentication protocol, as implemented by the identity provider server 140. At step 802, the identity provider server 140 receives the authentication request including the user identifier $ID_p$ from the principal device 120. In accordance with some embodiments, the identity provider server uses the user identifier $ID_p$ to identify the user associated with the principal device 120. For example, the user identifier $ID_p$ can be used to identify the account associated with the user at the identity provider server 140.

At step 804, the identity provider TEE 142 generates the authentication signature and the identity provider server 140 obtains the authentication signature from the identity provider TEE 142. The authentication signature is for authenticating the identity provider server 140 to the principal device 120. In some embodiments, the authentication signature is generated using at least one random number and is signed by the private key $SK_i$. The identity provider TEE 142 generates the at least one random number and stores the at least one random number in association with the user identifier $ID_p$ in the identity provider TEE 142. In some embodiments, the at least one generated random number is the first random number $RND_{A1}$ and the second random number $RND_{A2}$. By way of a specific and non-limiting example, the authentication signature is represented by $Sign_A(RND_{A1}, RND_{A2})_{SKi}$. The authentication signature $Sign_A(RND_{A1}, RND_{A2})_{SKi}$ is a signature generated using the first random number $RND_{A1}$ and the second random number $RND_{A2}$ and is signed by the private key $SK_i$.

At step 806, the identity provider server 140 transmits the authentication signature to the principal device 120.

At step 808, the identity provider server 140 receives the first authenticated encryption message from the principal device 120. The first authenticated encryption message is based on the authentication signature and the principal device key $K_p$. In a specific and non-limiting example of implementation, the first authenticated encryption message includes the first cipher text $C_{A1}$ and the first message authentication code $TAG_{A1}$. The first cipher text $C_{A1}$ is generated by the first authentication symmetric key $EK_A$ and the first message authentication code $TAG_{A1}$ is generated by the second authentication symmetric key $AK_A$. In some embodiments, the first cipher text $C_{A1}$ is derived by encrypting the second random number $RND_{A2}$ and the first message authentication code $TAG_{A1}$ is derived from the second random number $RND_{A2}$. By way of a specific and non-limiting example, the first authenticated encryption message may be denoted as $(C_{A1}, TAG_{A1})$, the first cipher text $C_{A1}$ may be denoted as $C_{A1}=E(RND_{A2})_{EK_A}$ and the first message authentication code $TAG_{A1}$ may be denoted as $TAG_{A1}=MAC(RND_{R2})_{AK_A}$.

At step 810, the identity provider TEE 142 decrypts the first authenticated encryption message using the at least one authentication symmetric key. The result of decrypting the first authenticated encryption message is used to authenticate the principal device 120.

The at least one authentication symmetric key is generated by the identity provider TEE 142. In accordance with some embodiments, the at least one authentication symmetric key is derived from at least one random number that was encrypted by the authentication signature, the user password and the principal device key $K_p$. In a specific and non-limiting example of implementation, the at least one authentication symmetric key is the first authentication symmetric key $EK_A$ and the second authentication symmetric key $AK_A$, derived from the first random number $RND_{A1}$, the user password, the principal device key $K_p$, and the secondary identifier. The user password, the principal device key $K_p$, and the secondary identifier were previously stored in the identity provider TEE 142 in association with the user identifier $ID_p$. As such, the user password, the principal device key $K_p$ and the secondary identifier can be obtained based on the user identifier $ID_p$ provided in the authentication request. In this example, the first authentication symmetric key $EK_A$ is generated by the first key derivation function $KDF_1(\ )$ and denoted as $EK_A=KDF_1(Hash(PWD), RND_{A1}, K_p, MF)$. Similarly, in this example, the second authentication symmetric key $AK_A$ is generated by the second key derivation function $KDF_1(\ )$ and denoted as $AK_A=KDF_2(Hash(PWD), RND_{A1}, K_p, MF)$. The generation of the at least one authentication symmetric key may be done at step 810o or may have been previously generated, for example, after receiving the registration request. For example, the first authentication symmetric key $EK_A$ and the second authentication symmetric key $AK_A$ may be derived in response to the authentication request and stored in the identity provider TEE 142 in association with the user identifier $ID_p$.

In a specific and non-limiting example of implementation, decrypting the first authenticated encryption message $(C_{A1}, TAG_{A1})$ includes decrypting the first cipher text $C_{A1}$ using the first authentication symmetric key $EK_A$ to obtain the second random number $RND_{A2}$ and decrypting the first message authentication code $TAG_A$ using the second symmetric $AK_A$. The first authenticated encryption message $(C_{A1}, TAG_{A1})$ is verified using the decrypted first message authentication code $TAG_A$. The second random number $RND_{A2}$ obtained from the first authenticated encryption message $(C_{A1}, TAG_{A1})$ may be compared to the second random number $RND_{A2}$ provided in the authentication signature $Sign_A(RND_{A1}, RND_{A2})_{SKi}$ to authenticate the principal device 120.

After decrypting and verifying the first authenticated encryption message, the identity provider TEE 142 generates the service provider key $K_{ps}$. In accordance with some embodiments, the identity provider TEE 142 generates the encrypted ticket T by encrypting the service provider key $K_{ps}$ using the identity provider key $K_{sp}$. The encrypted ticket T may be denoted as $T=E(K_{ps})_{K_{sp}}$. $E(\ )$ is any suitable encryption function. In some embodiments, the encrypted ticket T is generated by encrypting the service provider key $K_{ps}$ and the user identifier $ID_p$. In accordance with some embodiments, the identity provider key $K_{sp}$ is a symmetric key.

At step 812, the identity provider TEE 142 generates the second authenticated encryption message and the identity provider server obtains the second authenticated encryption message from the identity provider TEE 142. In accordance with some embodiments, the identity provider TEE 142 generates the second authenticated encryption message using the at least one authentication symmetric key. The second authenticated encryption message is generated by encrypting at least the service provider key $K_{ps}$. In accordance with some embodiments, the second authenticated encryption message is generated by encrypting the encrypted ticket T. In a specific and non-limiting example of implementation, the second authenticated encryption message is generated by encrypting the service provider key $K_{ps}$ and the encrypted ticket T.

In a specific and non-limiting example of implementation, the second authenticated encryption message includes the second cipher text $C_{A2}$ and the second message authentication code $TAG_{A2}$. In this example, the second cipher text $C_{A2}$ is generated by encrypting the service provider key $K_{ps}$ and the encrypted ticket T. In this example, the second cipher text $C_{A2}$ is encrypted using the first authentication symmetric key $EK_A$ and the second message authentication code $TAG_{A2}$ is encrypted using the second authentication symmetric key $AK_A$. For example, the second authenticated encryption message may be denoted as $(C_{A2}, TAG_{A2})$, the second cipher text $C_{A2}$ may be denoted as $C_{A2}=E(K_{ps}, T)_{EK_A}$ and the second message authentication code $TAG_{A2}$ may be denoted as $TAG_{A2}=MAC(K_{ps}, T)_{AK_A}$.

At step 814, the identity provider server 140 transmits the second authenticated encryption to the principal device 120. The second authenticated encryption is for confirming authentication of the principal device 120.

In some embodiments, in step 640, a connection between the principal device 120 and the identity provider server 140 is over a transport layer security (TLS) channel, or any other suitable connection.

It should be appreciated that in step 640, the identity provider server 140 provides the service provider key $K_{ps}$ to the principal device 120 such that the service provider key $K_{ps}$ may be used for secure communication between the principal device 120 and the service provider server 160.

Figure 9:
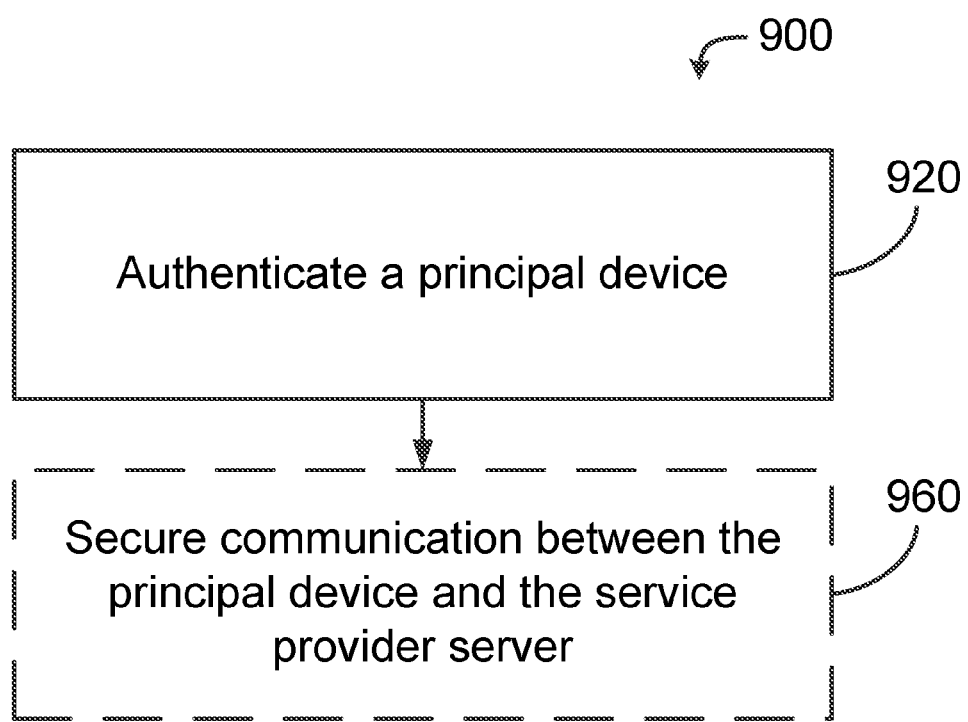
FIG. 9 is a flowchart illustrating an example method executed by a service provider server for authenticated communication between the service provider server and a principal device.

With reference to FIG. 9, in accordance with some embodiments, the service provider server 160 implements a method 900 including an authentication protocol based on TEE. At step 920, the service provider server 160 authenticates the principal device 120 based on TEE. At step 960, optionally, secure communication between the service provider server 160 and the principal device 120 occurs based on the service provider key $K_{ps}$. Step 920 is performed after the principal device 120 has been authenticated by the identity provider server 140, according to step 640.

Figure 10:
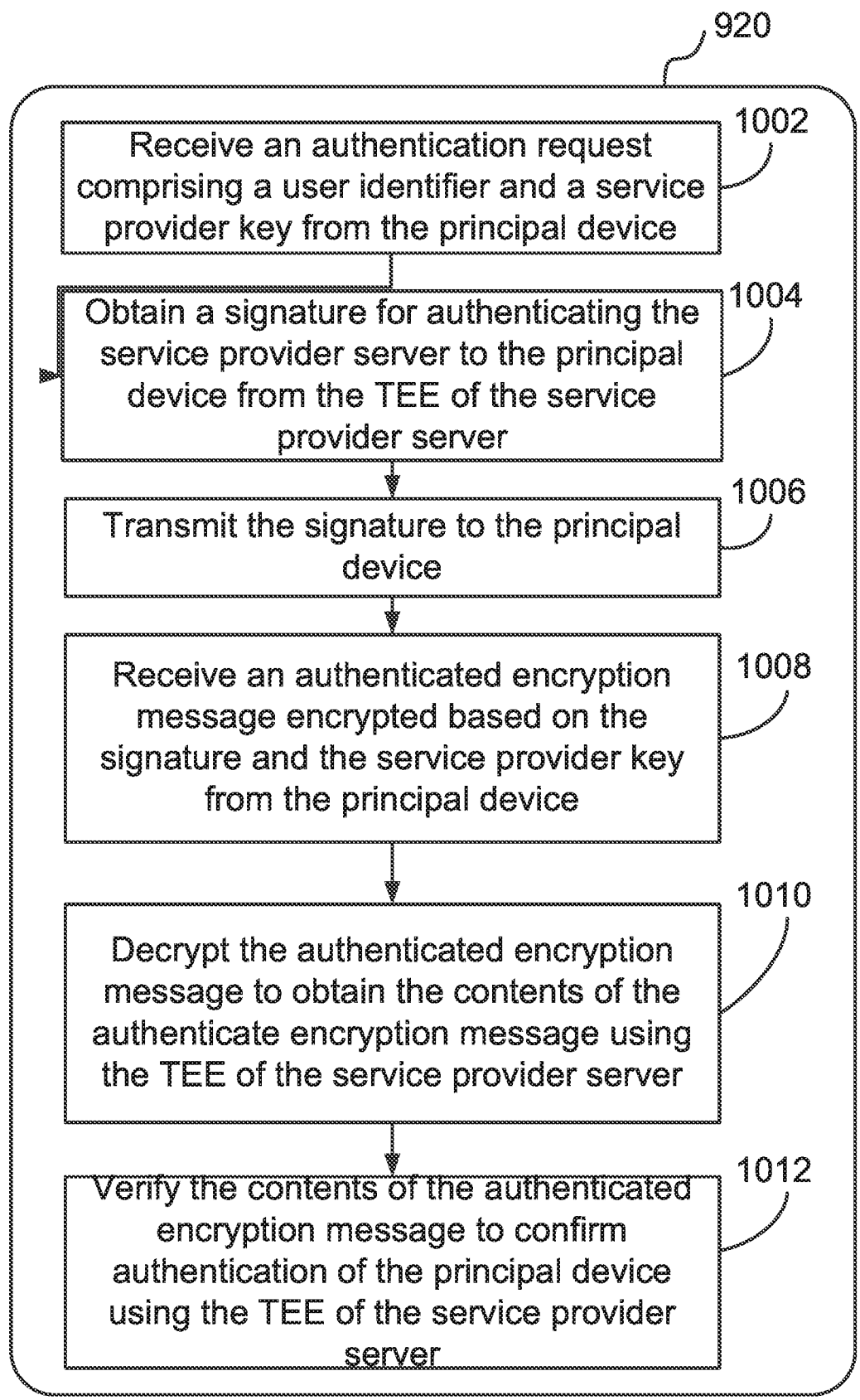
FIG. 10 is a flowchart illustrating an example embodiment for authentication of a principal device by a service provider server.

With reference to FIG. 10, there is illustrated an example embodiment of step 920, as implemented by the service provider server 160. At step 1002, the service provider server 160 receives the service provider authentication request including the user identifier $ID_p$ and the service provider key $K_{ps}$ from the principal device 120. In accordance with a specific and non-limiting example of implementation, the service provider authentication request includes the encrypted ticket T. In this example, encrypted ticket T was generated by encrypting the service provider key $K_{ps}$. In other words, the service provider key $K_{ps}$ is provided by the authentication request in the form of the encrypted ticket T.

In accordance with some embodiments, after receiving the service provider authentication request, the service provider TEE 162 decrypts the encrypted ticket T to obtain the service provider key $K_{ps}$ using the identity provider key $K_{sp}$. The service provider key $K_{ps}$ is stored in the service provider TEE 162 in association with the user identifier $ID_p$. In some embodiments, the identity provider server 140 provides the identity provider key $K_{sp}$ to the service provider server 140 prior to performance of method 900. The service provider server 140 stores the identity provider key $K_{sp}$ in the service provider TEE 162. In some embodiments, the service provider server 140 stores the identity provider key $K_{sp}$ in association with the user identifier $ID_p$. In some embodiments, the service provider server 160 requests the identity provider key $K_{sp}$ from the identity provider server 140.

At step 1004, the service provider TEE 162 generates the signature for authenticating the service provider server 160 to the principal device 120 and the service provider server 160 obtains the signature from the service provider TEE 162. In some embodiments, the signature is generated using at least one random number and is signed by the service provider private key $SK_s$. For example, prior to performance of step 1004 the service provider TEE 162 generates the service provider private key $SK_s$ and corresponding service provider public key $PK_s$, and stores the service provider private key $SK_s$ in the service provider TEE 162. In accordance with some embodiments, the service provider TEE 162 generates the service provider certificate including the service provider public key $PK_s$ and the service provider server 160 provides the service provider certificate to the principal device 120. The service provider TEE 162 generates the at least one random number and stores the at least one generated random number in association with the user identifier $ID_p$ in the service provider TEE 162. In some embodiments, the at least one generated random number is the first random number $RND_1$ and the second random number $RND_2$. By way of a specific and non-limiting example, the signature is represented by $Sign(RND_1, RND_2)_{SK_s}$ and is a signature of the first random number $RND_1$ and the second random number $RND_2$ signed by the service provider private key $SK_s$.

At step 16, the service provider server 160 transmits the signature to the principal device 120.

At step 18, the service provider server 160 receives the authenticated encryption message from the principal device 120. The authenticated encryption message is based on the signature and the service provider key $K_{sp}$. In a specific and non-limiting example of implementation, the authenticated encryption message includes the cipher text C encrypted using the first symmetric key EK and the message authentication code TAG generated using the second symmetric key AK. In this example, the cipher text C is generated by encrypting the second random number $RND_2$ and the message authentication code is derived from the second random number $RND_2$. By way of a specific and non-limiting example, the authenticated encryption message is denoted as (C, TAG), the cipher text C is denoted as $C=E(RND_2)_{EK}$ and the message authentication code TAG is denoted as $TAG=MAC(RND_2)_{AK}$.

At step 1010, the service provider TEE 162 decrypts the authenticated encryption message to obtain the plaintext of the authenticated encryption message. In accordance with some embodiments, the service provider TEE 162 decrypts the authenticated encryption message using the at least one symmetric key.

The at least one symmetric key is generated by the service provider TEE 162. In accordance with some embodiments, the at least one symmetric key is derived by the service provider TEE 162 from the at least one random number that was encrypted by the signature and the service provider key $K_{ps}$. In a specific and non-limiting example of implementation, the at least one symmetric key is the first symmetric key EK and the second symmetric key AK that are derived from the first random number $RND_1$ and the service provider key $K_{ps}$. In this example, the first symmetric key EK is generated by a first key derivation function $KDF_1( )$ and denoted as $EK=KDF_1(RND_1, K_{ps})$. Similarly, in this example, the second symmetric key AK is generated by a second key derivation function $KDF_2( )$ and denoted as $AK=KDF_2(RND_1, K_{ps})$. The at least one symmetric key may be generated at step 1010 or may have been previously generated, for example, after receiving the service provider authentication request. For example, the first symmetric key EK and the second symmetric key AK may be derived in response to the authentication request and stored in the service provider TEE 162 in association with the user identifier $ID_p$.

In a specific and non-limiting example of implementation, the service provider TEE 162 decrypts the authenticated encryption message (C, TAG) to obtain the second random number $RND_2$. For example, the cipher text C is decrypted using the first symmetric key EK to obtain the second random number $RND_2$ and the message authentication code is decrypted using the second symmetric key AK.

At step 1012, the service provider TEE 162 verifies the plaintext of the authenticated encryption message to authenticate the principal device 120. In accordance with some embodiments, the authenticated encryption message (C, TAG) is verified using the decrypted message authentication code TAG. The second random number $RND_2$ obtained from the authenticated encryption message (C, TAG) may be compared to the second random number $RND_2$ encrypted by the signature $Sign(RND_1, RND_2)_{SK_s}$ to authenticate the principal device 120.

In some embodiments, in step 920, a connection between the principal device 120 and the service provider server 160 is over a transport layer security (TLS) channel, or any other suitable connection.

It should be appreciated that in step 920, the principal device 120 provides the service provider key $K_{ps}$ to the service provider server 140 such that the service provider key $K_{ps}$ may be used for secure communication between the principal device 120 and the service provider server 160. For example, the first symmetric key EK and the second symmetric key AK generated based on the service provider key $K_{ps}$ may be used by both the service provider server 140 and the principal device 120 for secure communication therebetween.

To further illustrate the methods 200, 600 and 900, specific and non-limiting examples of implementations are described herein with reference to the signal flow diagrams illustrate in FIGS. 11A to 11F.

Figure 11A:
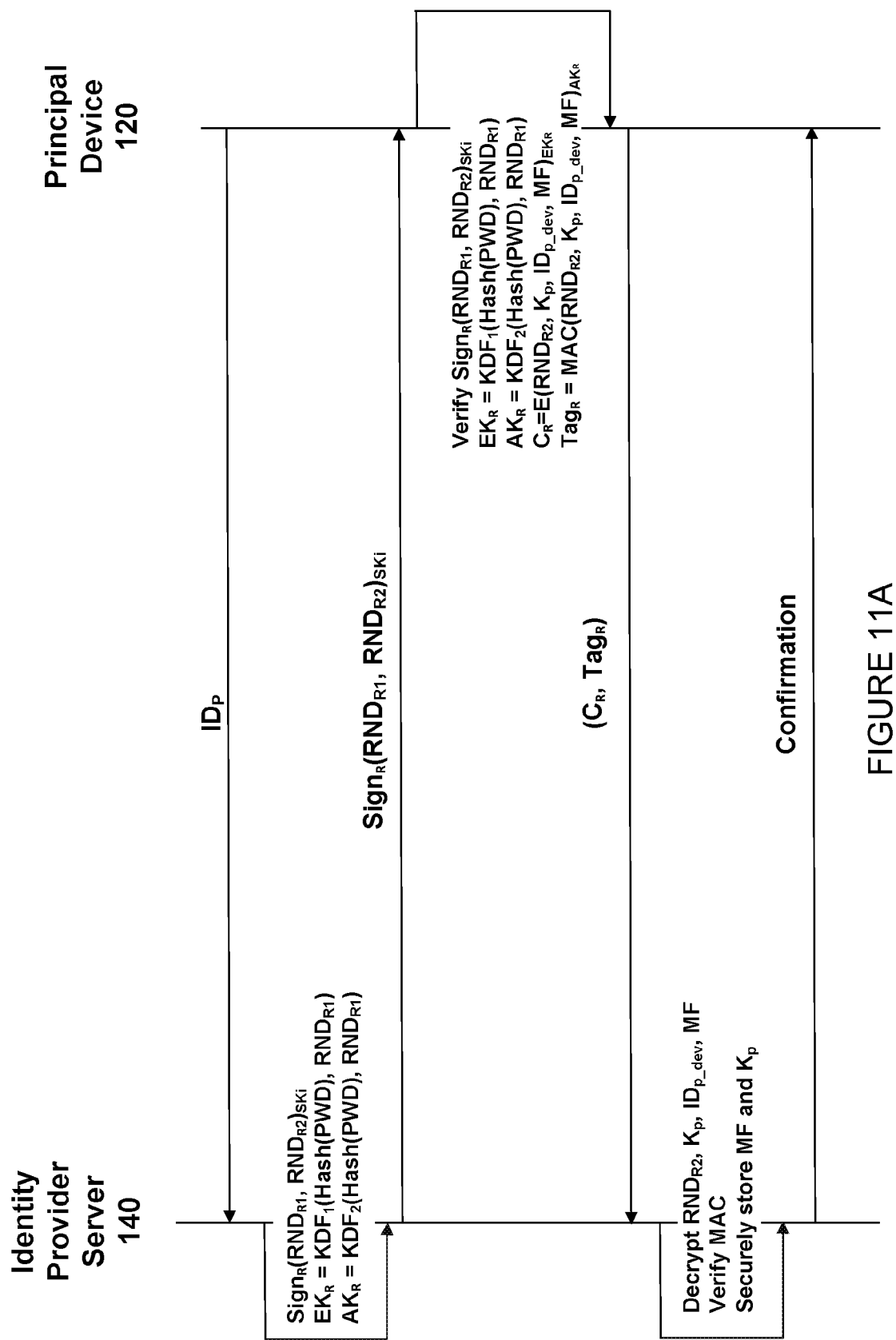
FIG. 11A illustrates an example of a signal flow diagram between an identity provider server and a principal device for registration of the principal device by the identity provider server.

With reference to FIG. 11A, a signal flow diagram illustrates a specific and non-limiting example of the principal device 120 being registering to the identity provider server 140. The principal device 120 transmits the registration request including the user identifier $ID_p$ to the identity provider server 140. The identity provider TEE 142 generates the first and second random numbers $RND_{R1}$ $RND_{R2}$. The identity provider TEE 142 generates the registration signature $Sign_R(RND_{R1}, RND_{R2})_{SKi}$ by signing the first and second random numbers $RND_{R1}$ $RND_{R2}$ using the private key $SK_i$. The identity provider TEE 142 generates the first registration symmetric key $EK_R$ and the second registration symmetric key $AK_R$ from the first random number $RND_{R1}$ and the user password previously stored in the identity provider TEE 142. The first registration symmetric key $EK_R$, the second registration symmetric key $AK_R$, and the first and second random numbers $RND_{R1}$ $RND_{R2}$ are stored in association with the user identifier $ID_p$ in the identity provider TEE 142. The identity provider server 140 transmits the registration signature $Sign_R(RND_R, RND_{R2})_{SKi}$ to the principal device 120. The principal device 120 verifies the registration signature $Sign_R(RND_{R1}, RND_{R2})_{SKi}$ using the public key $PK_i$ to obtain the first and second random numbers $RND_{R1}$ $RND_{R2}$. The principal TEE 122 generates the first registration symmetric key $EK_R$ and the second registration symmetric key $AK_R$ from the obtained first random number $RND_{R1}$ and the user password stored in the principal TEE 122. The principal TEE 122 generates the authentication message ($C_R$, $TAG_R$) including the cipher text $C_R$ and the message authentication code $TAG_R$. The cipher text $C_R$ is encrypted using the first registration symmetric key $EK_R$. The message authentication code $TAG_R$ is encrypted using the second registration symmetric key $AK_R$. The first cipher text $C_R$ is generated by encrypting the second random number $RND_{R2}$, the principal device key $K_p$, the device identifier $ID_{p\_dev}$ and the multi-factor identifier MF. The principal device TEE 120 transmits the authentication message ($C_R$, $TAG_R$) to the identity provider server 140. The identity provider server 140 receives the authentication message ($C_R$, $TAG_R$). The identity provider TEE 142 decrypts the authentication message ($C_R$, $TAG_R$) to obtain the second random number $RND_{R2}$, the principal device key $K_p$, the device identifier $ID_{p\_dev}$ and the multi-factor identifier MF. The identity provider TEE 142 verifies the message authentication code $TAG_R$ to confirm that the content of the decrypted cipher text $C_R$ is authentic. The identity provider TEE 142 securely stores the principal device key $K_p$ and the multi-factor identifier MF. The identity provider server 140 then sends a confirmation that the principal device 120 has been registered by the identity provider server 140.

Figure 11B:
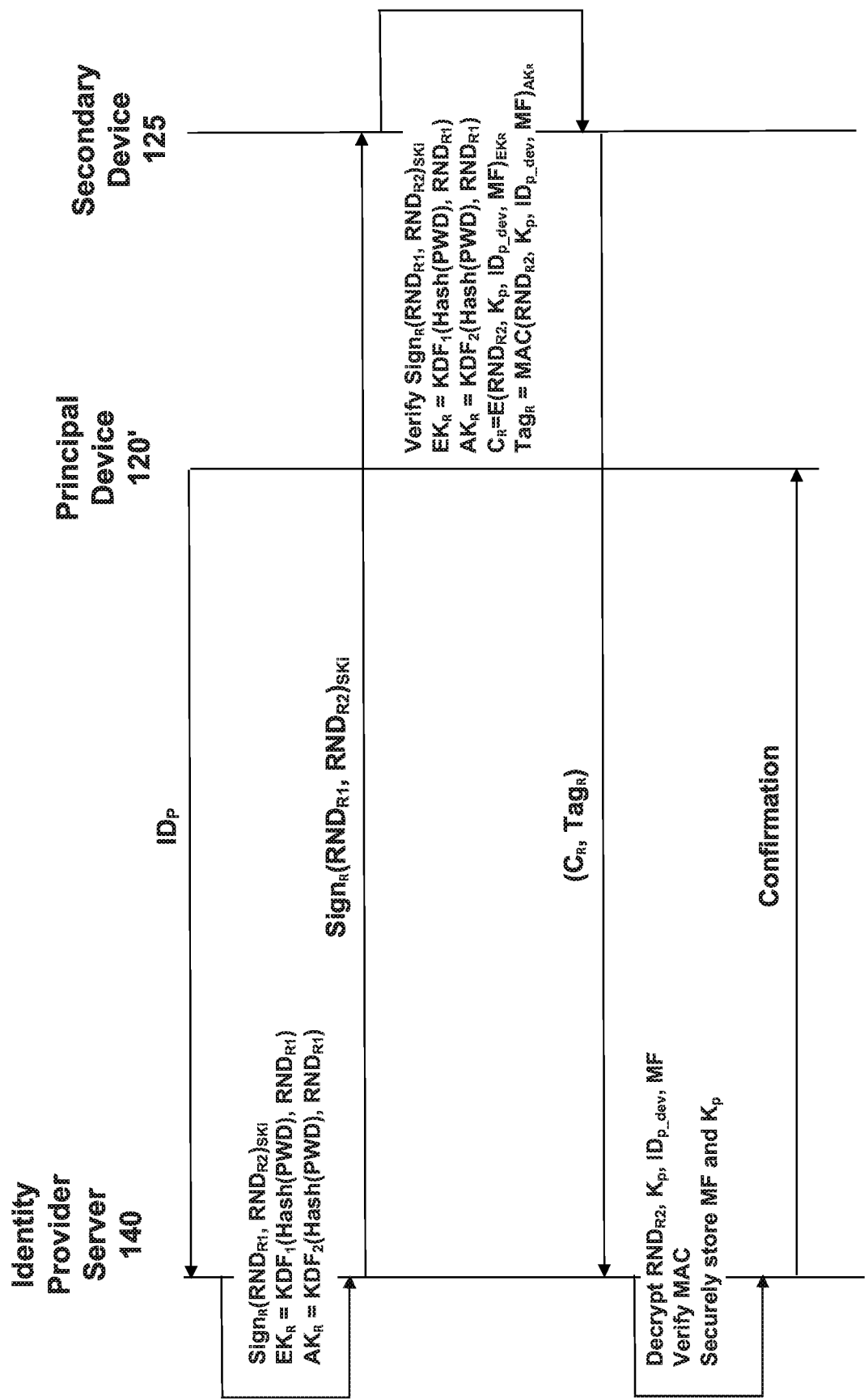
FIG. 11B illustrates an example of a signal flow diagram between an identity provider server, a principal device and a secondary device for registration of the principal device by the identity provider server.

With reference to FIG. 11B, a signal flow diagram illustrates a specific and non-limiting example of the principal device 120' registering to the identity provider server 140. In this example the principal device 120' receives and verifies the registration signature $Sign_R(RND_{R1}, RND_{R2})_{SKi}$ to obtain the first and second random numbers $RND_{R1}$ $RND_{R2}$. The principal device 120' provides the first and second random numbers $RND_{R1}$ $RND_{R2}$ to the secondary device 125 and the secondary TEE 122' generates the first registration symmetric key $EK_R$, the second registration symmetric key $AK_R$ and the authentication message ($C_R$, $TAG_R$). The secondary device 125 provides the authentication message ($C_R$, $TAG_R$) to the principal device 120' and the principal device 120' transmits the authentication message ($C_R$, $TAG_R$) to the identity provider server 140.

Figure 11C:
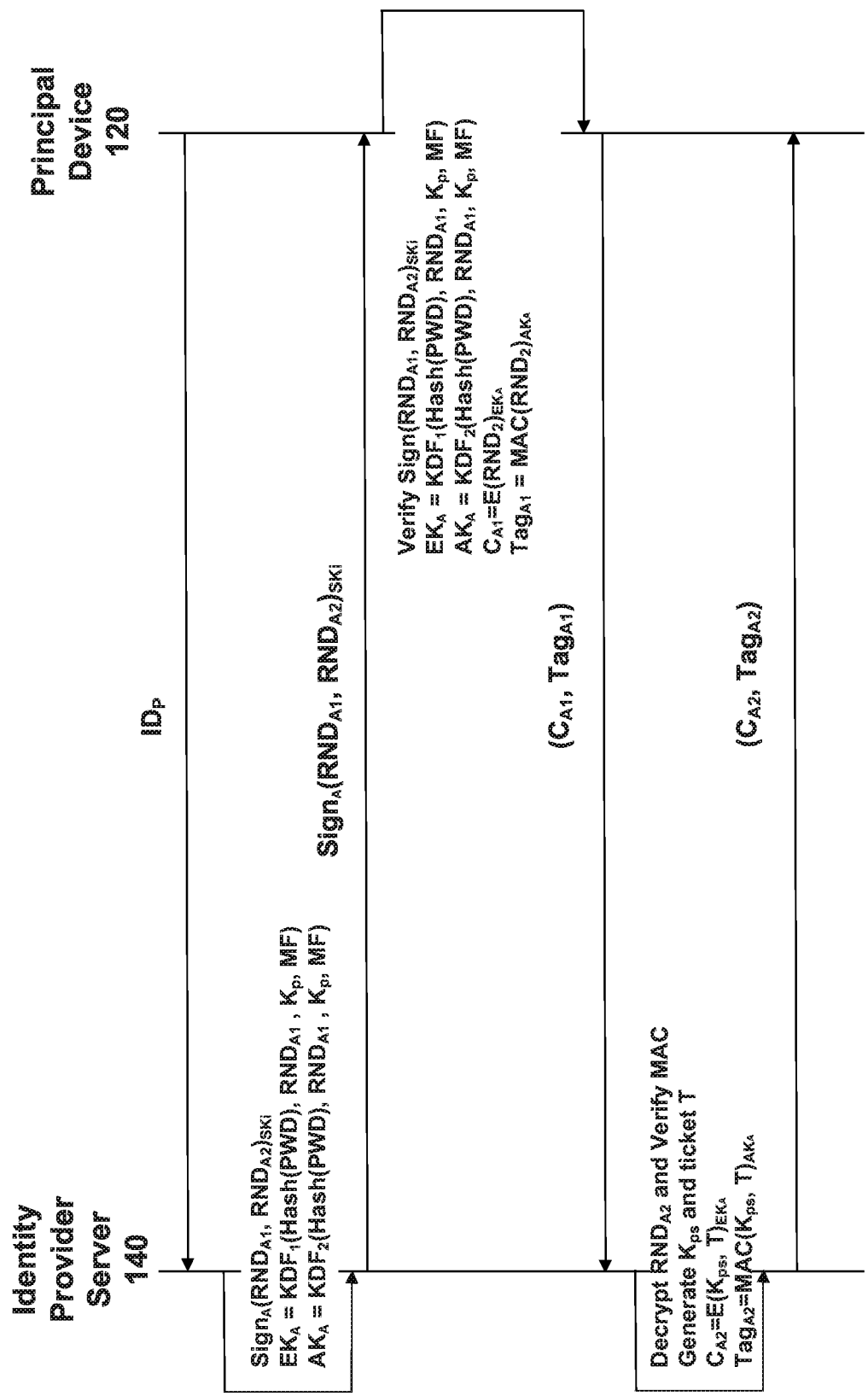
FIG. 11C illustrates an example of a signal flow diagram between an identity provider server and a principal device for authentication of the principal device by the identity provider server.

With reference to FIG. 11C, a signal flow diagram illustrates a specific and non-limiting example of the principal device 120 being authenticated by the identity provider server 140. The principal device 120 transmits the authentication request including the user identifier $ID_p$ to the identity provider server 140. The identity provider TEE 142 generates the first and second random numbers $RND_{A1}$ $RND_{A2}$. The identity provider TEE 142 generates the authentication signature $Sign_A(RND_{A1}, RND_{A2})_{SKi}$ by encrypting the first and second random numbers $RND_{A1}$ $RND_{A2}$ using the private key $SK_i$. The identity provider TEE 142 generates the first registration symmetric key $EK_R$ and the second registration symmetric key $AK_R$ from the first random number $RND_{R1}$ and from the user password, the principal device key $K_p$ and the multi-factor authentication identifier MF, previously stored in the identity provider TEE 142. The identity provider server 140 transmits the authentication signature $Sign_A(RND_{A1}, RND_{A2})_{SKi}$ to the principal device 120. The principal device 120 verifies the authentication signature $Sign_A(RND_{A1}, RND_{A2})_{SKi}$ to obtain the first and second random numbers $RND_{A1}$ $RND_{A2}$. The principal TEE 122 generates the first authentication symmetric key $EK_A$ and the second authentication symmetric key $AK_A$ from the obtained first random number $RND_{A1}$ and from the user password, the principal device key $K_p$ and the multi-factor authentication identifier MF, previously stored in the identity provider TEE 142. The principal TEE 122 generates the first authentication message ($C_{A1}$, $TAG_{A1}$) including the first cipher text $C_{A1}$ and the first message authentication code $TAG_{A1}$. The first cipher text $C_{A1}$ is encrypted using the first authentication symmetric key $EK_A$. The first message authentication code $TAG_A$ is encrypted using the second authentication symmetric key $AK_A$. The first cipher text $C_{A1}$ is generated by encrypting the second random number $RND_{A2}$. The principal device TEE 120 transmits the first authentication message ($C_{A1}$, $TAG_{A1}$) to the identity provider server 140. The identity provider 140 receives the first authentication message ($C_{A1}$, $TAG_{A1}$) and the identity provider TEE 142 decrypts the first authentication message ($C_{A1}$, $TAG_{A1}$) to obtain the second random number $RND_{R2}$. The identity provider TEE 142 verifies the first message authentication code $TAG_{A1}$ to confirm that the content of the first decrypted cipher text $C_{A1}$ is authentic. The identity provider TEE 142 verifies by comparing the received second random number $RND_{A2}$ to the second random number $RND_{A2}$ as signed by the authentication signature $Sign_A(RND_{A1}, RND_A)_{SKi}$. The identity provider TEE 142 generates the service provider key $K_{ps}$. The identity provider TEE 142 generates the encrypted ticket T by encrypting the service provider key $K_{ps}$ using the identity provider key $K_{sp}$. The identity provider TEE 142 generates the second authenticated encryption message ($C_{A2}$, $TAG_{A2}$) including the second cipher text $C_{A2}$ and the second message authentication code $TAG_{A2}$. The second cipher text $C_{A2}$ is generated by encrypting the service provider key $K_{sp}$ and the encrypted ticket T. The second cipher text $C_{A2}$ is encrypted using the first authentication symmetric key $EK_A$ and the second message authentication code $TAG_{A2}$ is encrypted using the second symmetric key $AK_A$. The identity provider server 140 transmits the second authenticated encryption message ($C_{A2}$, $TAG_{A2}$) to the principal device 120. The principal TEE 122 decrypts the second authenticated encryption message ($C_{A2}$, $TAG_{A2}$) using the first authentication symmetric key $EK_A$ and the second authentication symmetric key $AK_A$ to obtain the service provider key $K_{sp}$ and the encrypted ticket T. The principal TEE 122 verifies the service provider key $K_{sp}$ and the encrypted ticket T by comparing the decrypted second message authentication code $TAG_{A2}$ to the decrypted second cipher text $C_{A2}$.

Figure 11D:
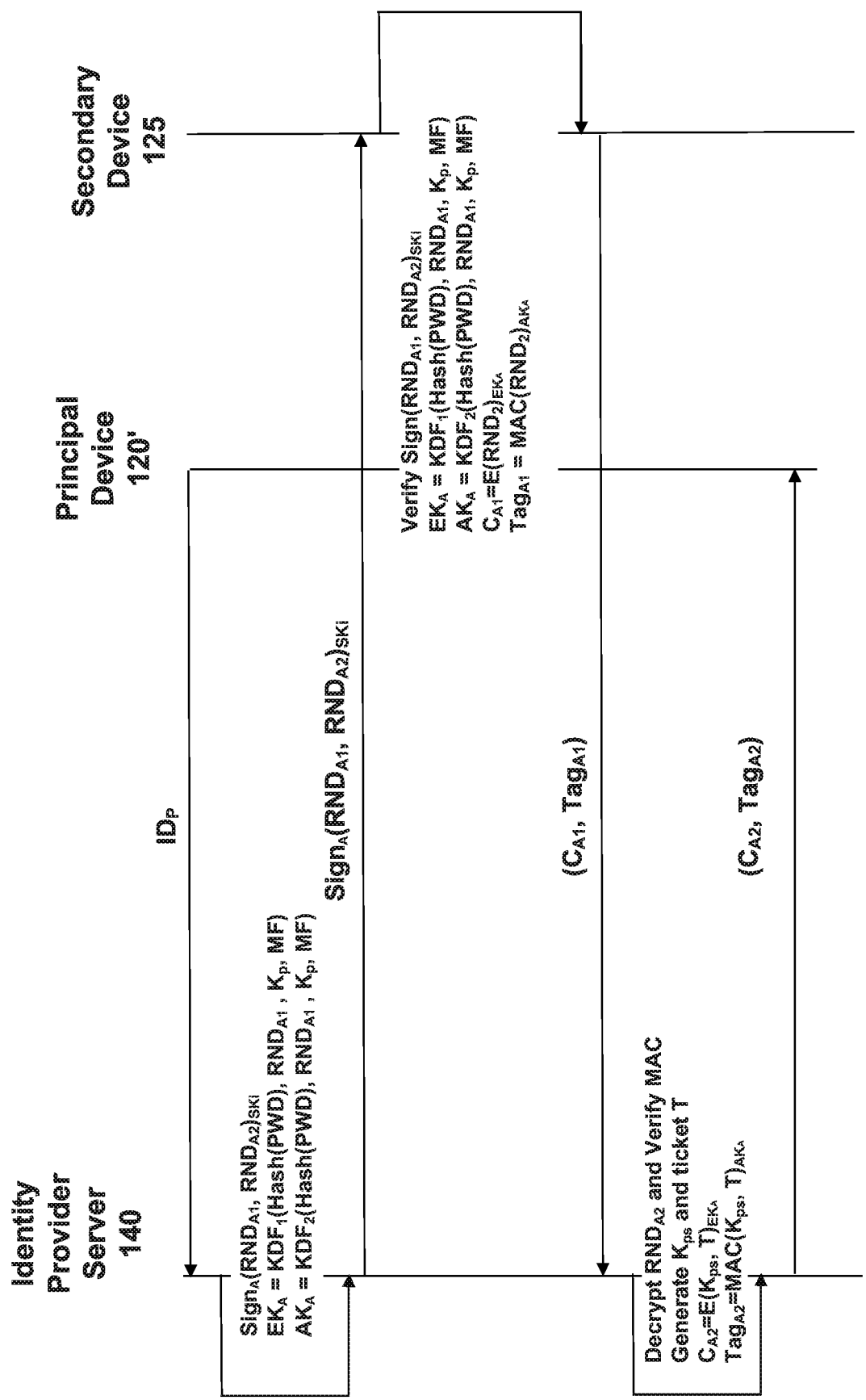
FIG. 11D illustrates an example of a signal flow diagram between an identity provider server, a principal device and a secondary device for authentication of the principal device by the identity provider server.

With reference to FIG. 11D, a signal flow diagram illustrates a specific and non-limiting example of the principal device 120' being authenticated by the identity provider server 140. In this example, the principal device 120' receives and verifies the authentication signature $Sign_A$ ($RND_{A1}$, $RND_{A2}$)$_{SKi}$ to obtain the first and second random numbers $RND_{A1}$ $RND_{A2}$. The principal device 120' provides the first and second random numbers $RND_{A1}$ $RND_{A2}$ to the secondary device 125. The secondary TEE 122' generates the first authentication symmetric key $EK_A$, the second authentication symmetric key $AK_A$ and the first authentication message ($C_{A1}$, $TAG_{A1}$). The secondary device 125 provides the first authentication message ($C_{A1}$, $TAG_{A1}$) to the principal device 120' and the principal device 120' transmits the first authentication message ($C_{A1}$, $TAG_{A1}$) to the identity provider server 140. Similarly, after the principal device 120' receives the second authentication message ($C_{A2}$, $TAG_{A2}$), the principal device 120' provides the second authentication message ($C_{A2}$, $TAG_{A2}$) to the secondary device 125 and the secondary TEE 122' decrypts and verifies the second authentication message ($C_{A2}$, $TAG_{A2}$).

Figure 11E:
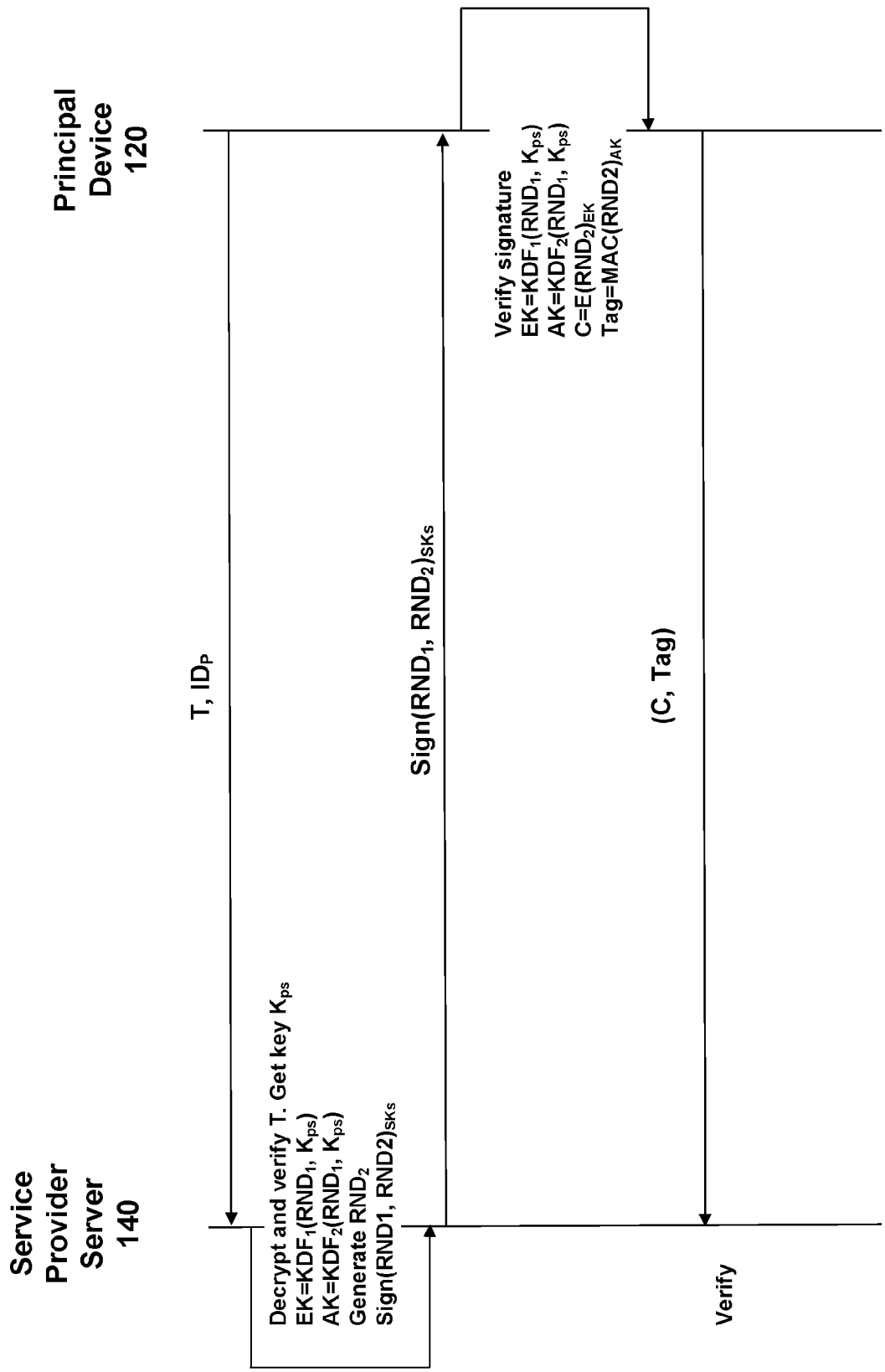
FIG. 11E illustrates an example of a signal flow diagram between a service provider server and a principal device for authentication of the principal device by the service provider server.

With reference to FIG. 11E, a signal flow diagram illustrates a specific and non-limiting example of the principal device 120 being authenticated by the service provider server 160. The principal device 120 transmits the service provider authentication request to the service provider server 160. The authentication request includes the user identifier $ID_p$ and the encrypted ticket T. The service provider TEE 162 decrypts the encrypted ticket T using the identity provider key $K_{sp}$ to obtain the service provider key $K_{ps}$. The service provider TEE 162 generates the first and second random numbers $RND_1$ $RND_2$. The service provider TEE 162 generates the signature $Sign(RND_1, RND_2)_{SKs}$ by encrypting the first and second random numbers $RND_1$ $RND_2$ using the service provider private key $SK_s$. The service provider TEE 162 generates the first symmetric key EK and the second symmetric key AK from the first random number $RND_1$ and the service provider key $K_{ps}$. The service provider server 160 transmits the signature $Sign(RND_1, RND_2)_{SKs}$ to the principal device 120. The principal device 120 verifies the signature $Sign(RND_1, RND_2)_{SKs}$ to obtain the first and second random numbers $RND_1$, $RND_2$. The principal TEE 122 generates the first symmetric key EK and the second symmetric key AK from the obtained first random number $RND_1$ and the service provider key $K_{ps}$ stored in the principal TEE 122. The principal TEE 122 generates the authentication message (C, TAG) including the cipher text C and the message authentication code TAG. The cipher text C is encrypted using the first symmetric key EK and the message authentication code TAG is encrypted using the second symmetric key AK. The first cipher text C is generated by encrypting the second random number $RND_2$. The principal device TEE 120 transmits the authentication message (C, TAG) to the service provider server 160. The service provider 160 receives the authentication message (C, TAG) and the service provider TEE 162 decrypts the authentication message (C, TAG) to obtain the second random number $RND_2$. The service provider TEE 162 verifies the message authentication code TAG to confirm that the plaintext of the decrypted cipher text C is authentic by comparing the obtained second random number $RND_2$ from the authentication message (C, TAG) to the second random number $RND_2$ signed by the signature $Sign(RND_1, RND_2)_{SKs}$. Afterwards, the principal device 120 and the service provider server 160 may securely communicate based on the service provider key $K_{ps}$. For example, the first symmetric key EK and the second symmetric key AK may be used for secure communication between the principal device 120 and the service provider server 160.

Figure 11F:
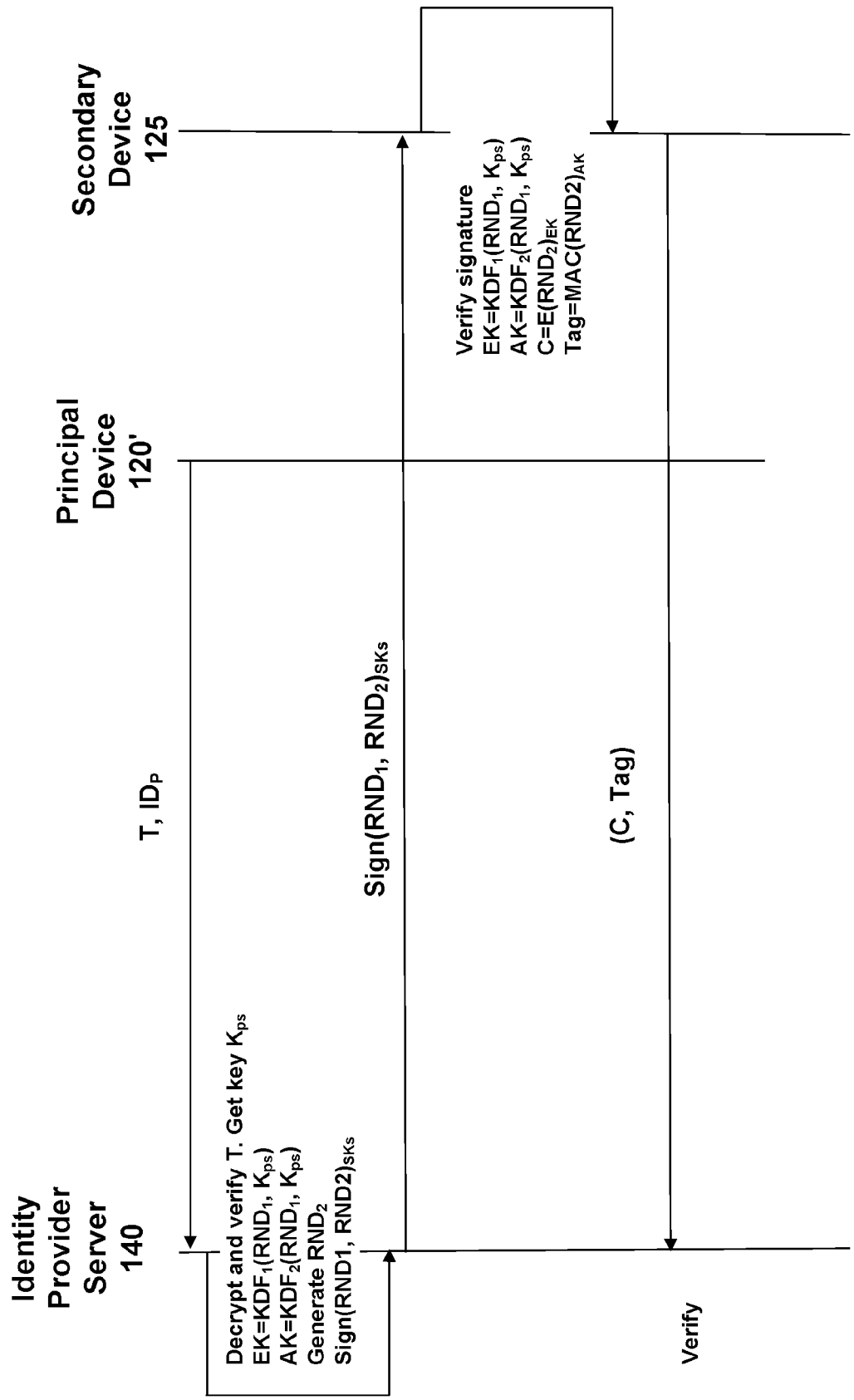
FIG. 11F illustrates an example of a signal flow diagram between a service provider server, a principal device and a secondary device for authentication of the principal device by the service provider server.

With reference to FIG. 11F, a signal flow diagram illustrates a specific and non-limiting example of the principal device 120' being authenticated by the service provider server 160. In this example, the principal device 120' receives and verifies the signature $Sign(RND_1, RND_2)_{SKs}$ to obtain the first and second random numbers $RND_1$, $RND_2$. The principal device 120' provides the first and second random numbers $RND_1$, $RND_2$ to the secondary device 125 and the secondary TEE 122' generates the first symmetric key EK, the second symmetric key AK and the authentication message (C, TAG). The secondary device 125 provides the authentication message (C, TAG) to the principal device 120' and the principal device 120' transmits the authentication message (C, TAG) to the service provider server 140.

Figure 12A:
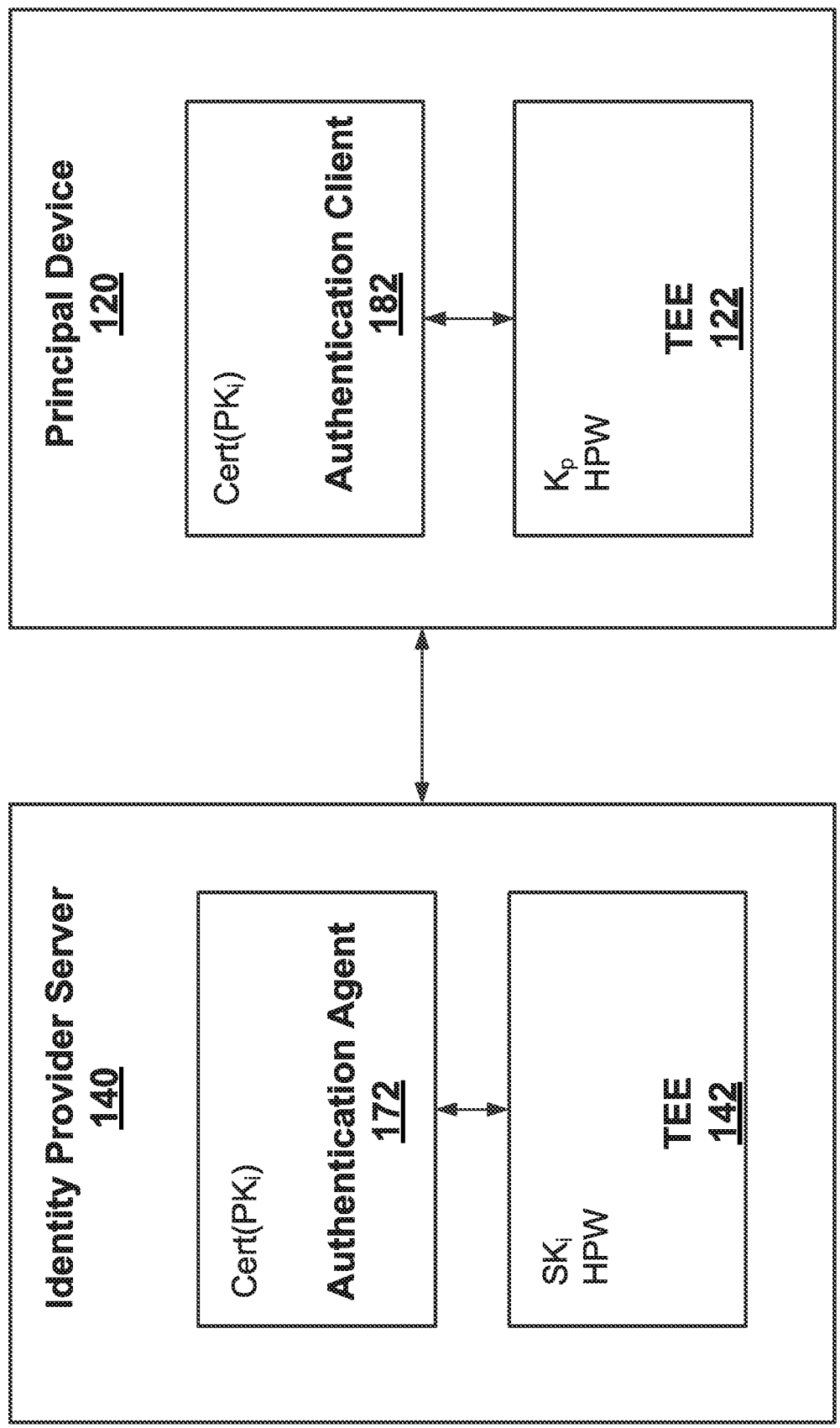
FIG. 12A is a block diagram of an example of an identity provider server and a principal device prior to registration of the principal device to the identity provider server.

FIG. 12A is a block diagram of an example of the identity provider server 140 and the principal device 120 prior to registration between the principal device 120 and the identity provider server 140. In some embodiments, a principal authentication client 182 implements the method 200 and an identity provider authentication agent 172 implements the method 600. As shown, the identity provider TEE 142 stores the private key $SK_i$ and the user password. The identity provider authentication agent 172 interfaces with the identity provider TEE 142. The identity provider authentication agent 172 obtains the certificate including the public key $PK_i$ from the identity provider TEE 142. The identity provider authentication agent 172 provides input and instructions for processing to be performed on the input to the identity provider TEE 142, and receives a corresponding output. The input includes data that the authentication agent 172 provides to the identity provider TEE 142 in order to implement the method 200. For example, the input can be the principal $ID_p$ and a request to generate the registration signature and the output can be the registration signature. As shown, the principal TEE 122 stores the principal device key $K_p$ and the user password. The principal authentication client 182 interfaces with the identity provider authentication agent 172 and obtains the certificate including the public key $PK_i$ from the identity provider authentication agent 172. The principal authentication client 182 interfaces with the principal TEE 122. For example, the principal authentication client 182 provides input and instructions for processing to be performed on the input to the principal TEE 122, and receives a corresponding output. The input includes data that the principal authentication client 182 provides to the principal TEE 122 in order to implement the method 600. For example, the input may be the registration signature and the output may be the authenticated encryption message.

Figure 12B:
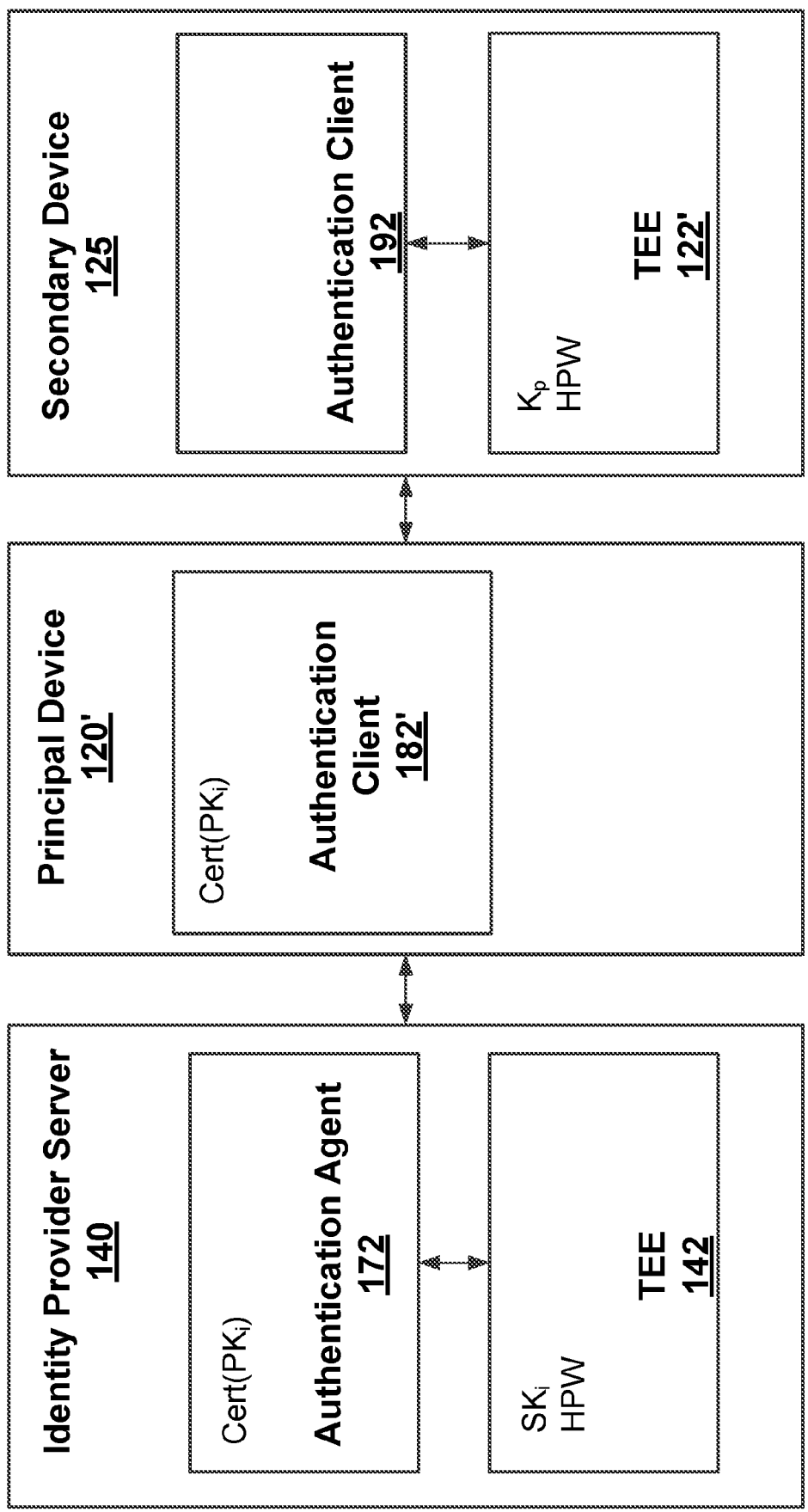
FIG. 12B is a block diagram of an example of an identity provider server, a principal device and a secondary device.

FIG. 12B is a block diagram of an example of the identity provider server 140 and the principal device 120' prior to registration between the principal device 120' and the identity provider server 140. In some embodiments, a principal authentication client 182' and/or the secondary authentication client 192 implements the method 200 and the identity provider authentication agent 172 implements the method 600. FIG. 12B is a variant of FIG. 12A. In this example, secondary TEE 122' stores the principal device key $K_p$ and the user password. The secondary authentication client 192 interfaces with the secondary TEE 122'. The secondary authentication client 192 provides input and instructions for processing to be performed on the input to the secondary TEE 122', and receives a corresponding output. The principal authentication client 182' interfaces with identity provider authentication agent 172 and obtains the certificate including the public key $PK_i$ from the identity provider authentication agent 172. The principal authentication client 182' interfaces with the secondary authentication client 192 to facilitate communication between the secondary authentication client 192 and the identity provider authentication agent 172.

Figure 12C:
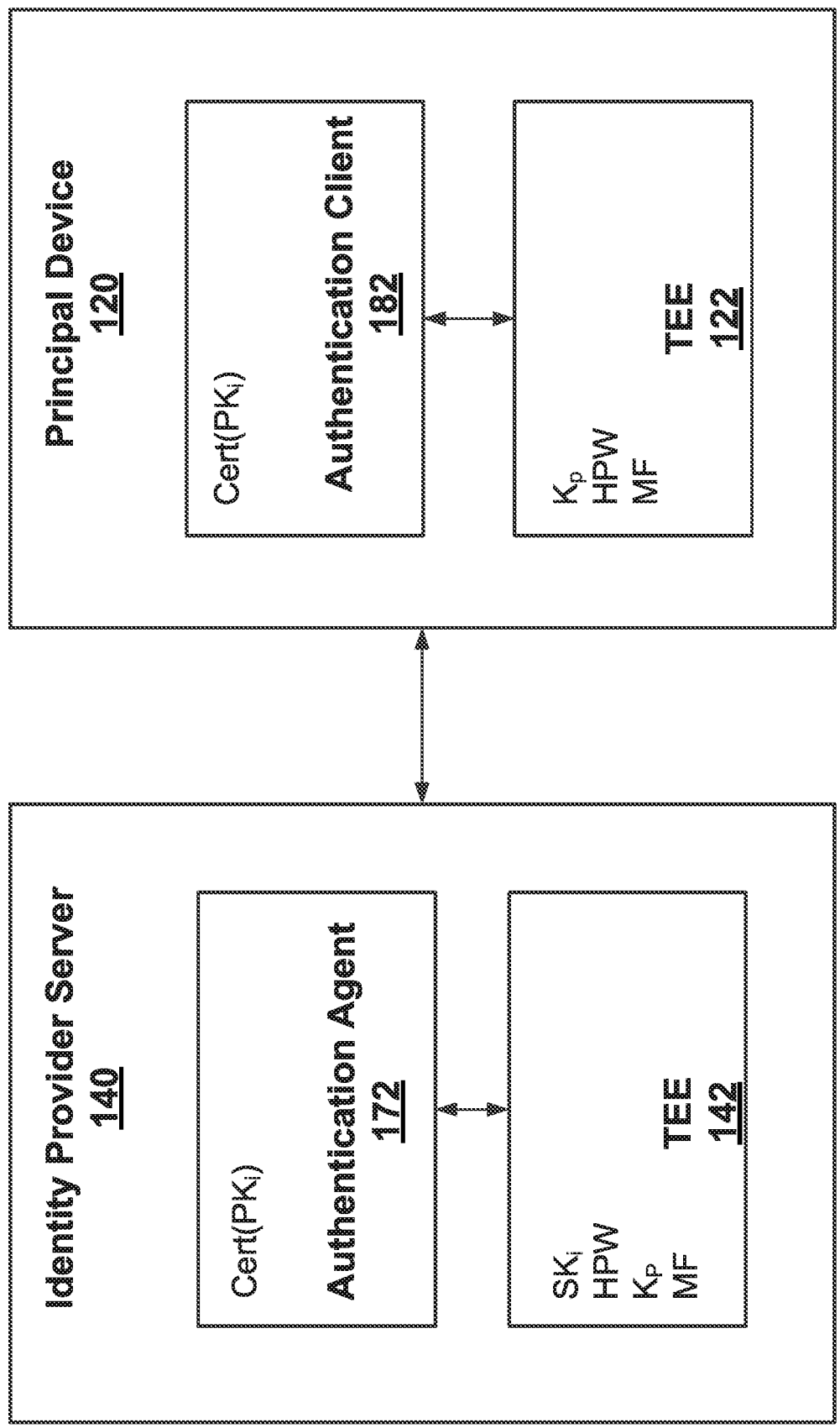
FIG. 12C is a block diagram of an example of an identity provider server and a principal device after the principal device has been registered by the identity provider server.

FIG. 12C is a block diagram of an example of the identity provider server 140 and the principal device 120 after the registration between the principal device 120 and the identity provider server 140. In this example, the identity provider TEE 142 stores the principal device key $K_p$ and the multi-factor identifier MF.

Figure 12D:
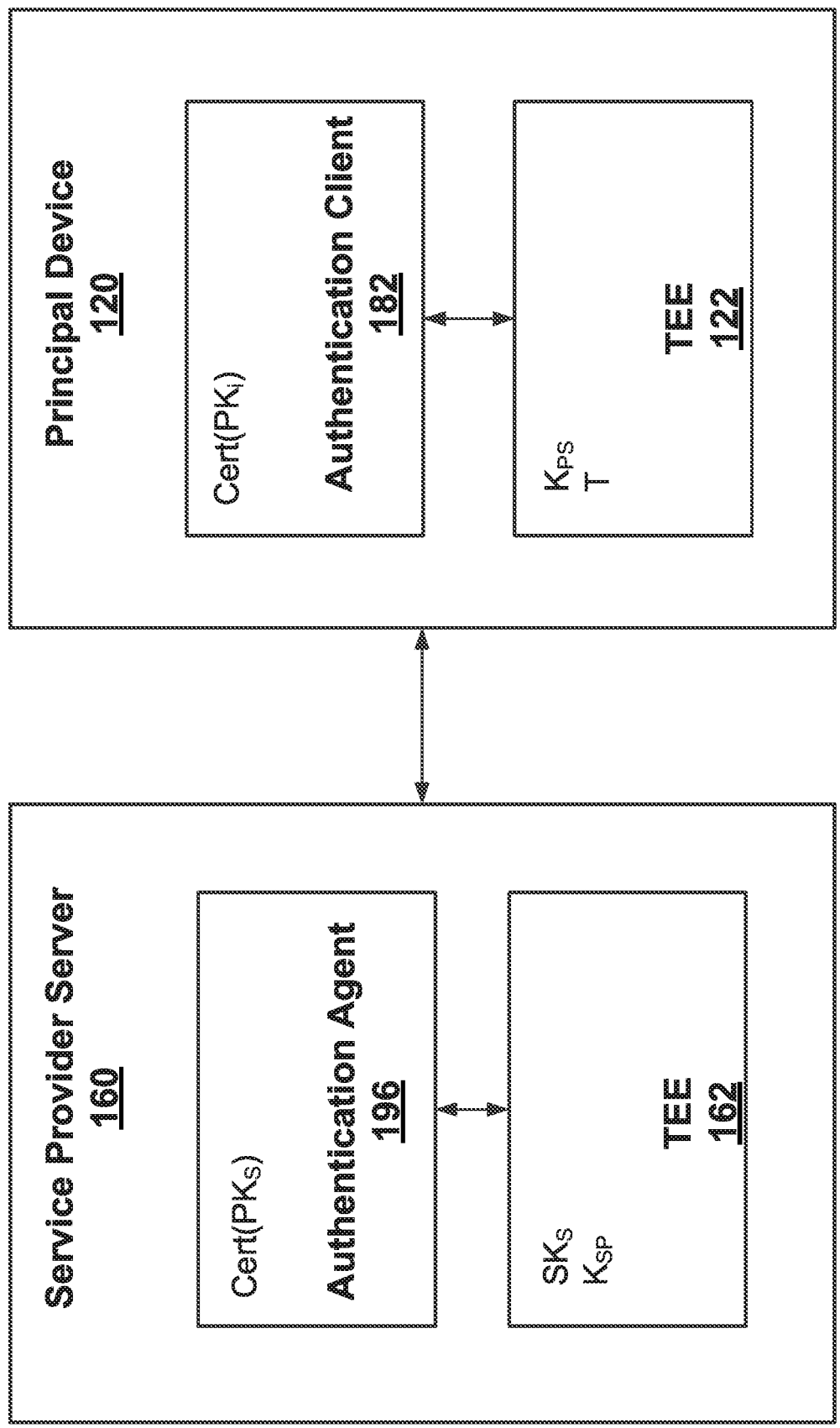
FIG. 12D is a block diagram of an example of a service provider server and a principal device.

FIG. 12D illustrates a block diagram of an example of the service provider server 160 and the principal device 120 after the principal device 120 has been registered and authenticated by the identity provider server 140 and before the principal device 120 has been authenticated by the service provider server 160. In some embodiments, the principal authentication client 182 implements the method 200 and a service provider authentication agent 196 implements the method 900. As shown, the service provider TEE 162 stores the service provider private key $SK_s$ and the identity provider key $K_{sp}$. The service provider authentication agent 196 interfaces with the service provider TEE 162. The service provider authentication agent 196 obtains the certificate including the service provider public key $PK_s$ from the service provider TEE 162. The service provider authentication agent 196 provides input and instructions for processing to be performed on the input to the service provider TEE 162, and receives a corresponding output. The input includes data that the authentication agent 196 provides to the service provider TEE 162 in order to implement the method 900. For example, the input can be the encrypted ticket T, the principal $ID_p$ and a request to generate the signature, and the output is the signature. As shown, the principal TEE 122 stores the service provider key $K_{ps}$ and the encrypted ticket T. The principal authentication client 182 interfaces with service provider authentication agent 196. The principal authentication client 182 obtains the certificate including the service provider public key $PK_s$ from the service provider authentication agent 196.

The principal authentication clients 182, 182' are computer programs used to access the identity provider server 140 via the identity provider authentication agent 172 and used to access the service provider server 160 via the service provider authentication agent 196. Similarly, authentication agents 172, 196 are computer programs that allow the principal device 120 to access the identity provider server 140 and service provider server 160 via the principal authentication clients 182, 182', respectively. For example, the authentication clients 182, 182' send requests to the authentication agent 172 or 196 which respond to the request.

The key derivation functions $KDF_1(\ )$, $KDF_2(\ )$ described herein may vary depending on practical implementations. The principal TEE 122, the identity provider TEE 142, the service provider TEE 162 and the secondary TEE 122' may use the same key derivation functions or different key derivation functions, depending on practical implementations. The encryption function $E(\ )$ and the message authentication code function $MAC(\ )$ described herein may vary depending on practical implementations. The principal TEE 122, the identity provider TEE 142, the service provider TEE 162 and the secondary TEE 122' may use the same encryption function and message authentication code function or a different encryption function and a different message authentication code function, depending on practical implementations.

It should be appreciated that the methods 200, 600 and 900 may be used to implement single sign-on authentication. For example, the principal device 120, after being registered and authenticated by the identity provider server 140, may be able to be authenticated by one or more service provider servers of the type of service provider server 160.

It should be appreciated that although the methods 200, 600 and 900 are described with reference to a single principal device 120, a plurality of principal devices of the type of principal device 120 may be registered and/or authenticated by the identity provider server 140 and/or the service provider server 160.

It should be further appreciated what although random numbers are generated and used in various embodiments described herein, other suitable identifiers may be used in replacement of the random numbers, such as quasi-random numbers, random alphanumeric strings, random non-numeric strings, and the like.

Figure 13:
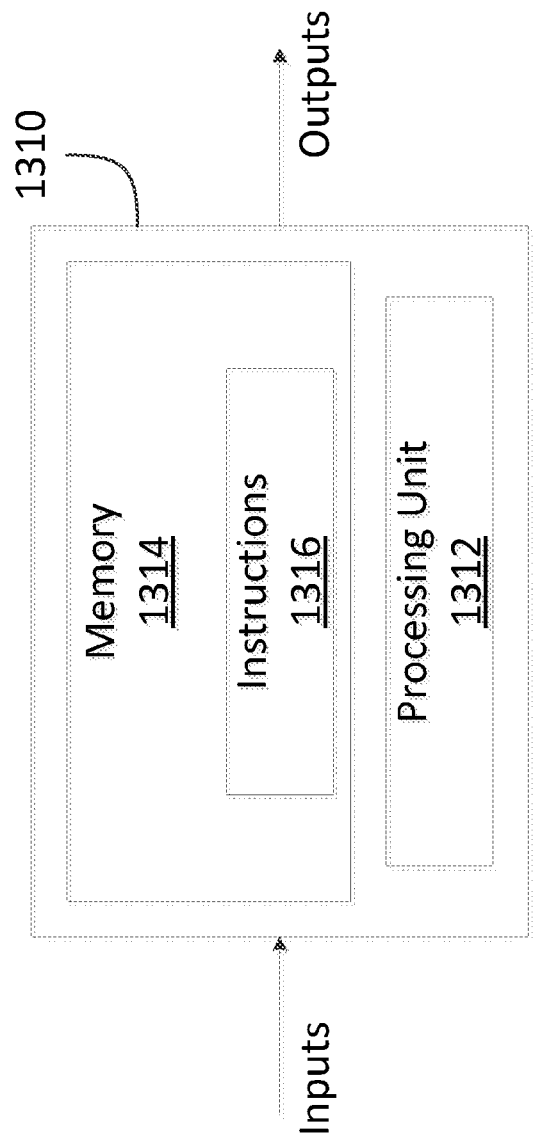
FIG. 13 is a block diagram of an example computing system for implementing the methods described herein in accordance with some embodiments.

With reference to FIG. 13, each of the methods 200, 600 and 900 may be implemented by a computing device 1310, including a processing unit 1312 and a memory 1314 which stores computer-executable instructions 1316. The processing unit 1312 may include any suitable devices configured to implement the system such that instructions 1316, when executed by the computing device 1310 or other programmable apparatus, may cause the functions/acts/steps of the method 200, 600 and/or 900 as described herein to be executed. The processing unit 1312 may include, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The processing unit 1312 may include a trusted execution environment. The trusted execution environment may be implemented as a secure area of the processing unit 1312. Alternatively, the trusted execution environment may be separate from the processing unit 1312 and may be interfaced with the processing unit 1312. The trusted execution environment allows for certain computer-executable instructions and data to be isolated from the processing unit 1312.

The memory 1314 may include any suitable known or other machine-readable storage medium. The memory 1314 may include non-transitory computer readable storage medium, for example, but not limited to, an electronic, magnetic, optical, electromagnetic, infrared, or semiconductor system, apparatus, or device, or any suitable combination of the foregoing. The memory 1314 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 1314 may include any storage means (e.g., devices) suitable for retrievably storing machine-readable instructions 1316 executable by processing unit 512.

The methods and systems described herein may be implemented in a high level procedural or object oriented programming or scripting language, or a combination thereof, to communicate with or assist in the operation of a computer system, for example the computing device 1310. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may include computer-readable instructions which cause a computer, or in some embodiments the processing unit 1312 of the computing device 1310, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A principal device comprising:
   at least one hardware processor; and
   a memory having stored thereon program instructions executable by the at least one hardware processor for:
      transmitting, to an identity provider server, a registration request comprising a user identifier associated with a user of the principal device;
      receiving, from the identity provider server, a signature for authenticating the identity provider server to the principal device;
      authenticating the identity provider server using the signature;
      obtaining, from a trusted execution environment associated with the principal device, an authenticated encryption message based on the signature and a principal device key associated with the principal device, wherein the obtaining the authenticated encryption message comprises:
         generating, by the trusted execution environment associated with the principal device, the authenticated encryption message using at least one symmetric key, wherein generating the at least one symmetric key comprises:
            deriving a first symmetric key and a second symmetric key from a first random number and a user password,
         wherein the generating the authenticated encryption message comprises:
            deriving a cipher text using the first symmetric key and deriving a message authentication code using the second symmetric key, wherein the cipher text is derived from a second random number, the principal device key, a device identifier associated with the principal device and a secondary identifier associated with the user of the principal device; and
      transmitting, to the identity provider server, the authenticated encryption message for registration of the principal device.

2. The principal device of claim 1, wherein the generating the at least one symmetric key comprises:
   generating, by the trusted execution environment associated with the principal device, the at least one symmetric key from at least one random number obtained from the signature.

3. The principal device of claim 1, wherein the message authentication code is derived from the second random number, the principal device key, the device identifier and the secondary identifier.

4. The principal device of claim 1, wherein a secondary device comprises the trusted execution environment, and the secondary device is communicatively coupled to the principal device.

5. A method for registering a principal device to an identity provider server, the method comprising:
   transmitting, to the identity provider server, a registration request comprising a user identifier associated with a user of the principal device;
   receiving, from the identity provider server, a signature for authenticating the identity provider server to the principal device;
   authenticating the identity provider server using the signature;

obtaining, from a trusted execution environment associated with the principal device, an authenticated encryption message based on the signature and a principal device key associated with the principal device, wherein the obtaining the authenticated encryption message comprises:

generating, by the trusted execution environment associated with the principal device, the authenticated encryption message using at least one symmetric key, wherein generating the at least one symmetric key comprises:

deriving a first symmetric key and a second symmetric key from a first random number and a user password, wherein the generating the authenticated encryption message comprises:

deriving a cipher text using the first symmetric key and deriving a message authentication code using the second symmetric key, wherein the cipher text is derived from a second random number, the principal device key, a device identifier associated with the principal device and a secondary identifier associated with the user of the principal device; and transmitting, to the identity provider server, the authenticated encryption message for registration of the principal device.

6. The method of claim 5, wherein the generating the at least one symmetric key comprises:

generating, by the trusted execution environment associated with the principal device, the at least one symmetric key from at least one random number obtained from the signature.

7. The method of claim 5, wherein the message authentication code is derived from the second random number, the principal device key, the device identifier and the secondary identifier.

8. The method of claim 5, wherein a secondary device comprises the trusted execution environment, and the secondary device is communicatively coupled to the principal device.

* * * * *